United States Patent
Yang et al.

(10) Patent No.: US 11,516,799 B2
(45) Date of Patent: Nov. 29, 2022

(54) METHOD FOR TERMINAL TRANSMITTING APERIODIC CHANNEL STATE INFORMATION IN WIRELESS COMMUNICATION SYSTEM, AND TERMINAL THAT USES THE METHOD

(71) Applicant: LG Electronics Inc., Seoul (KR)

(72) Inventors: Suckchel Yang, Seoul (KR); Hanjun Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/764,778

(22) PCT Filed: Nov. 15, 2018

(86) PCT No.: PCT/KR2018/013969
§ 371 (c)(1),
(2) Date: May 15, 2020

(87) PCT Pub. No.: WO2019/098693
PCT Pub. Date: May 23, 2019

(65) Prior Publication Data
US 2020/0367244 A1 Nov. 19, 2020

Related U.S. Application Data

(60) Provisional application No. 62/590,631, filed on Nov. 26, 2017, provisional application No. 62/586,867, filed on Nov. 15, 2017.

(51) Int. Cl.
*H04W 72/04* (2009.01)
*H04W 72/02* (2009.01)
(Continued)

(52) U.S. Cl.
CPC ....... *H04W 72/0453* (2013.01); *H04W 72/02* (2013.01); *H04W 72/1268* (2013.01); *H04W 72/1289* (2013.01); *H04W 72/14* (2013.01)

(58) Field of Classification Search
CPC ............. H04W 72/0453; H04W 72/02; H04W 72/1268; H04W 72/1289
See application file for complete search history.

(56) References Cited

U.S. PATENT DOCUMENTS

| | | | |
|---|---|---|---|
| 10,841,904 B2 * | 11/2020 | Yin | H04W 72/14 |
| 2014/0029532 A1 * | 1/2014 | Han | H04W 16/18 370/329 |

(Continued)

FOREIGN PATENT DOCUMENTS

WO 2016/159629 10/2016

OTHER PUBLICATIONS

Ericsson, "On aperiodic and semi-persistent CSI reporting on PUCCH," R1-1718443, 3GPP TSG RAN WG1 Meeting 90bis, Prague, CZ, Oct. 9-13, 2017, 3 pages.

(Continued)

*Primary Examiner* — Kevin M Cunningham
(74) *Attorney, Agent, or Firm* — Fish & Richardson P.C.

(57) ABSTRACT

A method for a terminal transmitting aperiodic channel state information (A-CSI), and a device using the method are provided. The method is characterised by: receiving a higher layer signal that configures a plurality of PUCCH resource sets; receiving DCI indicating one of PUCCH resources that are included in the plurality of PUCCH resource sets; and transmitting the A-CSI using a PUCCH resource that is determined based on the higher layer signal and the DCI, wherein the terminal selects one PUCCH resource set of the plurality from PUCCH resource sets based on a CSI process to which the A-CSI is transmitted, and transmits the A-CSI (Continued)

using the PUCCH resource that is indicated by the DCI of PUCCH resources that are included in the selected single PUCCH resource set.

14 Claims, 20 Drawing Sheets

(51) Int. Cl.
*H04W 72/12* (2009.01)
*H04W 72/14* (2009.01)

(56) References Cited

U.S. PATENT DOCUMENTS

| | | |
|---|---|---|
| 2015/0162966 A1 | 6/2015 | Kim et al. |
| 2016/0219618 A1 | 7/2016 | Alvarino et al. |
| 2016/0323078 A1* | 11/2016 | Takeda .................. H04B 7/024 |
| 2017/0070277 A1 | 3/2017 | Si et al. |
| 2019/0132861 A1* | 5/2019 | Koorapaty ............ H04L 1/1896 |

OTHER PUBLICATIONS

Huawei, HiSilicon, "Resource allocation for PUCCH," R1-1717073, 3GPP TSG RAN WG1 Meeting #90bis, Prague, Czech Republic, Oct. 9-13, 2017, 7 pages.

Ericsson, "On remaining details of CSI reporting," R1-1718432, Presented at 3GPP TSG RAN WG1 Meeting 90bis, Prague, CZ, Oct. 9-13, 2017, 15 pages.

Extended European Search Report in European Appln. No. 18878736. 0, dated Jul. 21, 2021, 10 pages.

Huawei & HiSilicon, "Discussion on UCI feedback for URLLC," R1-1717094, Presented at 3GPP TSG RAN WG1 Meeting #90bis, Prague, Czech Republic, Oct. 9-13, 2017, 5 pages.

* cited by examiner

METHOD FOR TERMINAL TRANSMITTING APERIODIC CHANNEL STATE INFORMATION IN WIRELESS COMMUNICATION SYSTEM, AND TERMINAL THAT USES THE METHOD

CROSS-REFERENCE TO RELATED APPLICATIONS

This application is a National Stage application under 35 U.S.C. § 371 of International Application No. PCT/KR2018/013969, filed on Nov. 15, 2018, which claims the benefit of U.S. Provisional Applications No. 62/586,867, filed on Nov. 15, 2017, and No. 62/590,631, filed on Nov. 26, 2017. The disclosures of the prior applications are incorporated by reference in their entirety.

BACKGROUNDS

Field of the Disclosure

The disclosure relates to wireless communication and, more particularly, to a method for a UE to transmit aperiodic channel state information in a wireless communication system and a UE using the method.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication.

Also, communication systems considering services or user equipments (UEs) sensitive to reliability and latency are under discussion. Next-generation RAT considering enhanced mobile broadband communication, massive MTC, and ultra-reliable and low-latency communication (URLLC) may be referred to as new RAT or new radio (NR).

In NR, a method for supporting orthogonal frequency division multiplexing (OFDM) that allows variable numerology according to various services is being considered. That is, in an NR system, OFDM (or a multiple access scheme) that enables each time and frequency resource region to have independent numerology may be considered.

Further, the NR system is designed in consideration of flexibility as an important aspect in order to support various services. For example, defining a scheduling unit as a slot, a structure that enables a random slot to be dynamically changed to a physical downlink shared channel (PDSCH, i.e., a physical channel transmitting downlink data) transmission slot (hereinafter, "DL slot") or a physical uplink shared channel (PUSCH, i.e., a physical channel transmitting uplink data) transmission slot (hereinafter, "UL slot") may be supported, which may also be expressed as supporting a dynamic DL/UL configuration.

Although aperiodic channel state information (A-CSI) is conventionally transmitted through a PUSCH, A-CSI may be transmitted through a physical uplink control channel (PUCCH) in the NR system.

In this case, a method for configuring/allocating a PUCCH resource for transmitting A-CSI is required. Further, when a collision occurs between a PUCCH resource for transmitting A-CSI and a resource for a different uplink physical channel, for example, a PUCCH or PUSCH resource, it is needed to specify how to handle the collision.

SUMMARY

An aspect of the disclosure is to provide a method for a UE to transmit aperiodic channel state information in a wireless communication system and a UE using the method.

In one aspect provided is a method for transmitting aperiodic channel state information (A-CSI). The method performed by a user equipment (UE) comprises receiving a higher-layer signal configuring a plurality of physical uplink control channel (PUCCH) resource sets; receiving downlink control information (DCI) informing one of PUCCH resources among the plurality of PUCCH resource sets; and transmitting A-CSI using a PUCCH resource determined based on the higher-layer signal and the DCI, wherein the UE selects one PUCCH resource set from among the plurality of PUCCH resource sets based on a channel state information (CSI) process for which the A-CSI is transmitted, and transmits the A-CSI using the PUCCH resource informed by the DCI among PUCCH resources among the selected one PUCCH resource set.

The higher-layer signal may be a radio resource control (RRC) signal.

The DCI may be received through a physical downlink control channel (PDCCH).

The CSI process may be a set of a reference signal and a resource element for CSI measurement.

The DCI may comprise information indicating triggering of the CSI process among a plurality of CSI processes.

The DCI may be an uplink grant scheduling uplink transmission by the UE.

Each of the PUCCH resources comprised in the plurality of PUCCH resource sets may comprise one or two symbols in a slot in a time domain.

In other aspect, provided is a user equipment (UE) comprising a transceiver to transmit and receive a radio signal; and a processor coupled with the transceiver to operate, wherein the processor receives a higher-layer signal configuring a plurality of physical uplink control channel (PUCCH) resource sets, receives downlink control information (DCI) informing one of PUCCH resources among the plurality of PUCCH resource sets, and transmits A-CSI using a PUCCH resource determined based on the higher-layer signal and the DCI, and the UE selects one PUCCH resource set from among the plurality of PUCCH resource sets based on a channel state information (CSI) process for which the A-CSI is transmitted, and transmits the A-CSI using the PUCCH resource informed by the DCI among PUCCH resources among the selected one PUCCH resource set.

In the disclosure, aperiodic channel state information may be transmitted through a PUCCH rather than a PUSCH. For this case, a method for determining a PUCCH resource is provided. In NR, scheduling flexibility may be very high, and there may be a wide variety of demands of delay depending on the service. In consideration of these aspects, a PUCCH resource for transmitting aperiodic channel state information may be determined using both a higher-layer signal and downlink control information when determining the PUCCH resource. Further, a solution that can be applied when a collision occurs between a PUCCH transmitting aperiodic channel state information and another uplink channel may be provided, thereby improving system performance.

DESCRIPTION OF EXEMPLARY EMBODIMENTS

Figure 1:
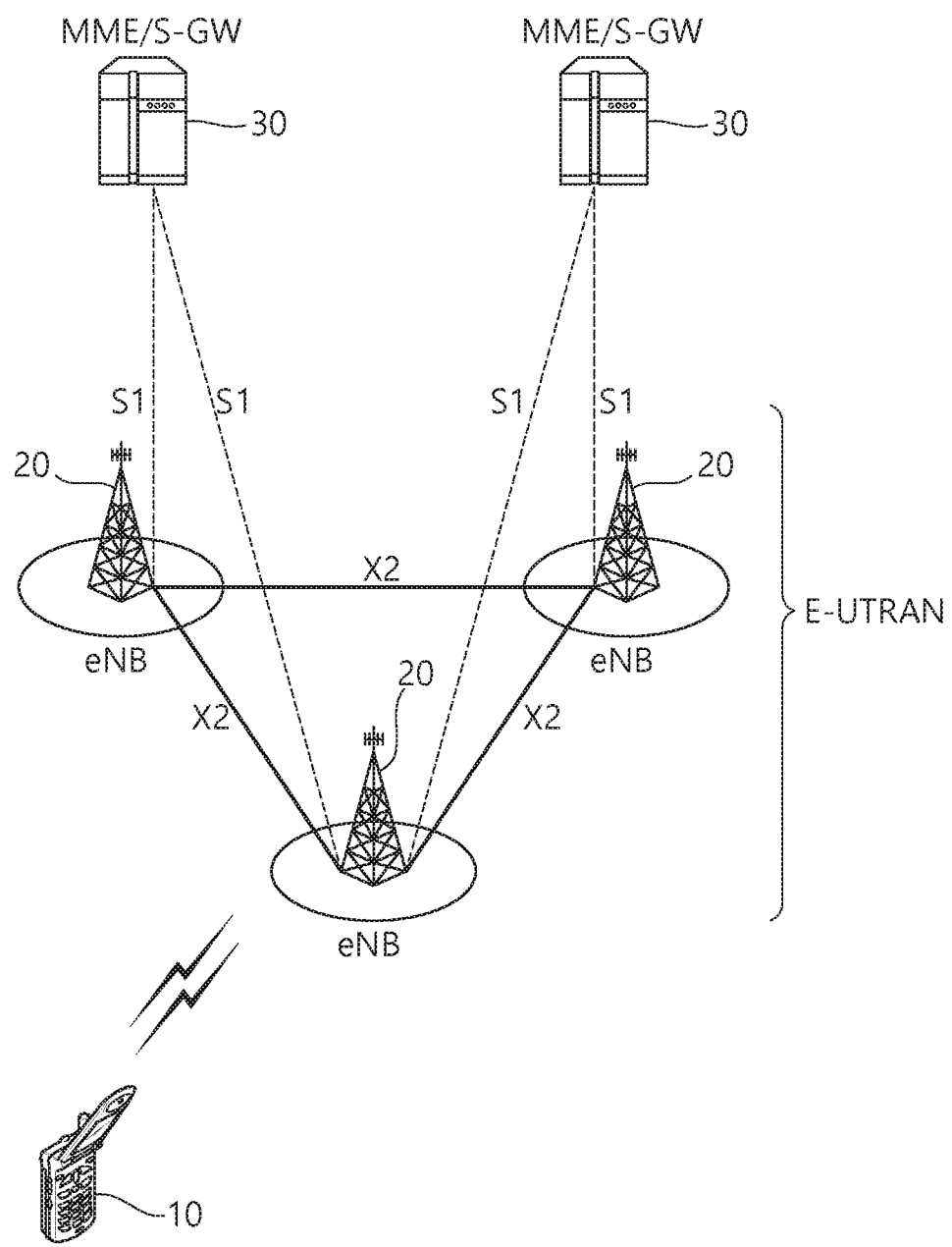
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
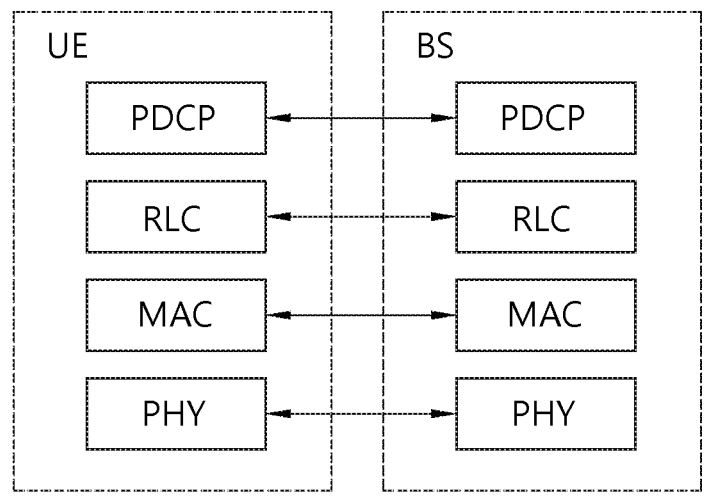
FIG. 2 is a diagram showing a wireless protocol architecture for a user plane.
Figure 3:
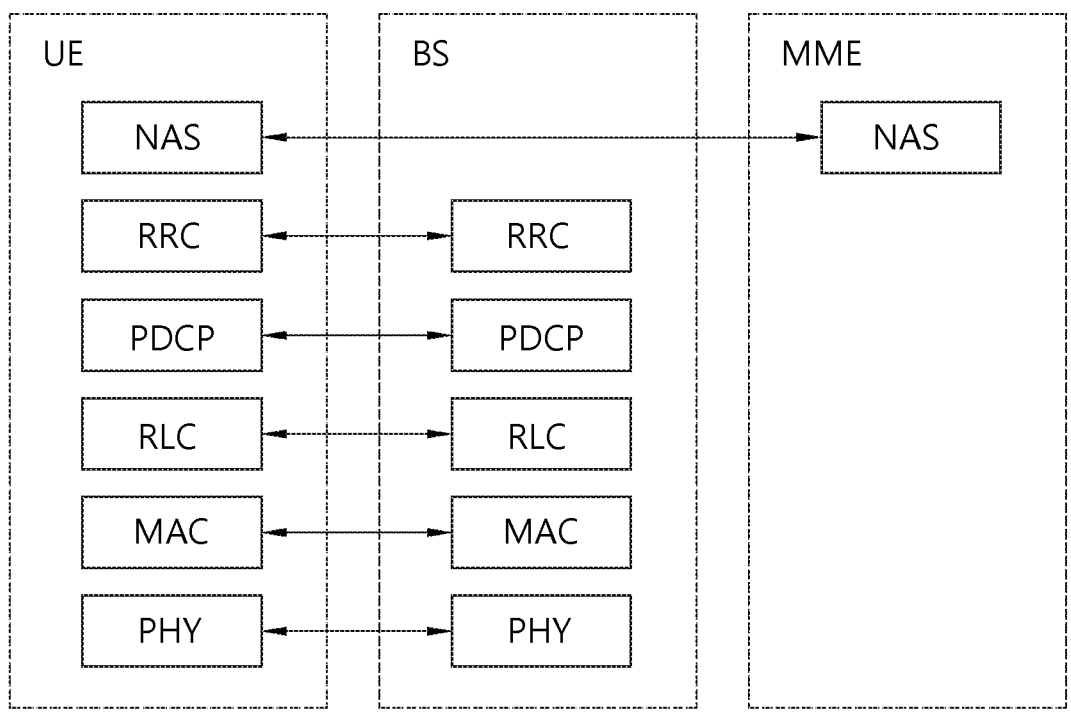
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
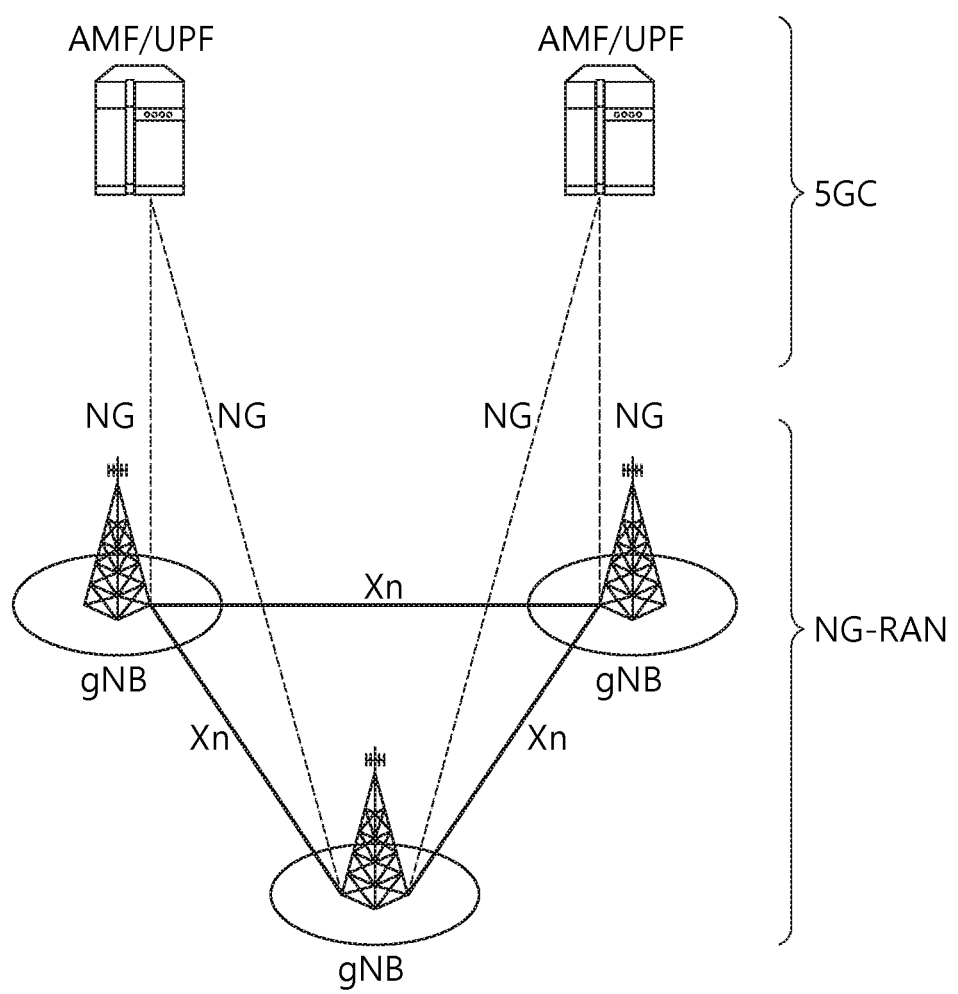
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions of inter-cell radio resource management (RRM), radio bearer (RB) control, connection mobility control, radio admission control, measurement configuration and provision, dynamic resource allocation, and the like. The AMF may provide functions of NAS security, idle state mobility handling, and the like. The UPF may provide functions of mobility anchoring, PDU processing, and the like.

Figure 5:
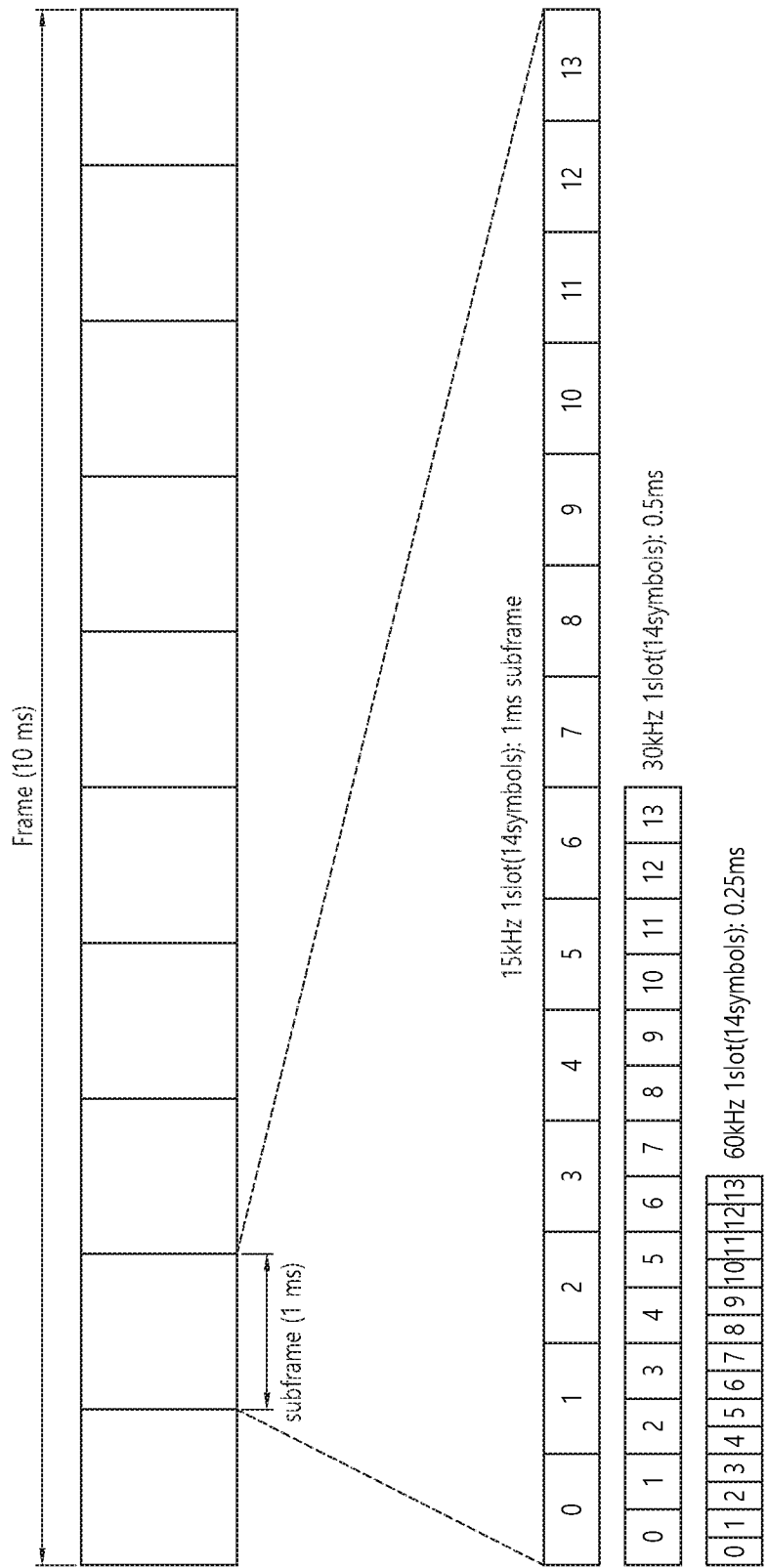
FIG. 5 illustrates an example of a frame structure that may be applied in NR.

FIG. 5 illustrates an example of a frame structure that may be applied in NR.

Referring to FIG. 5, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
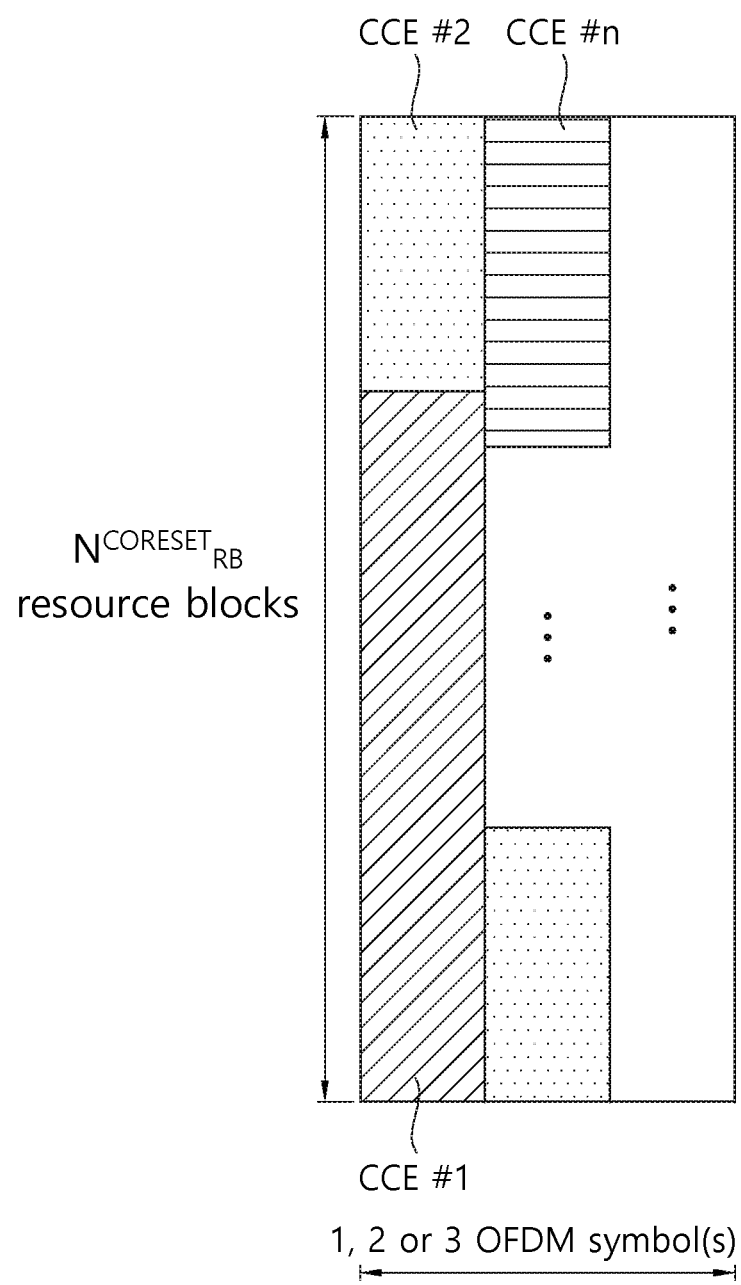
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
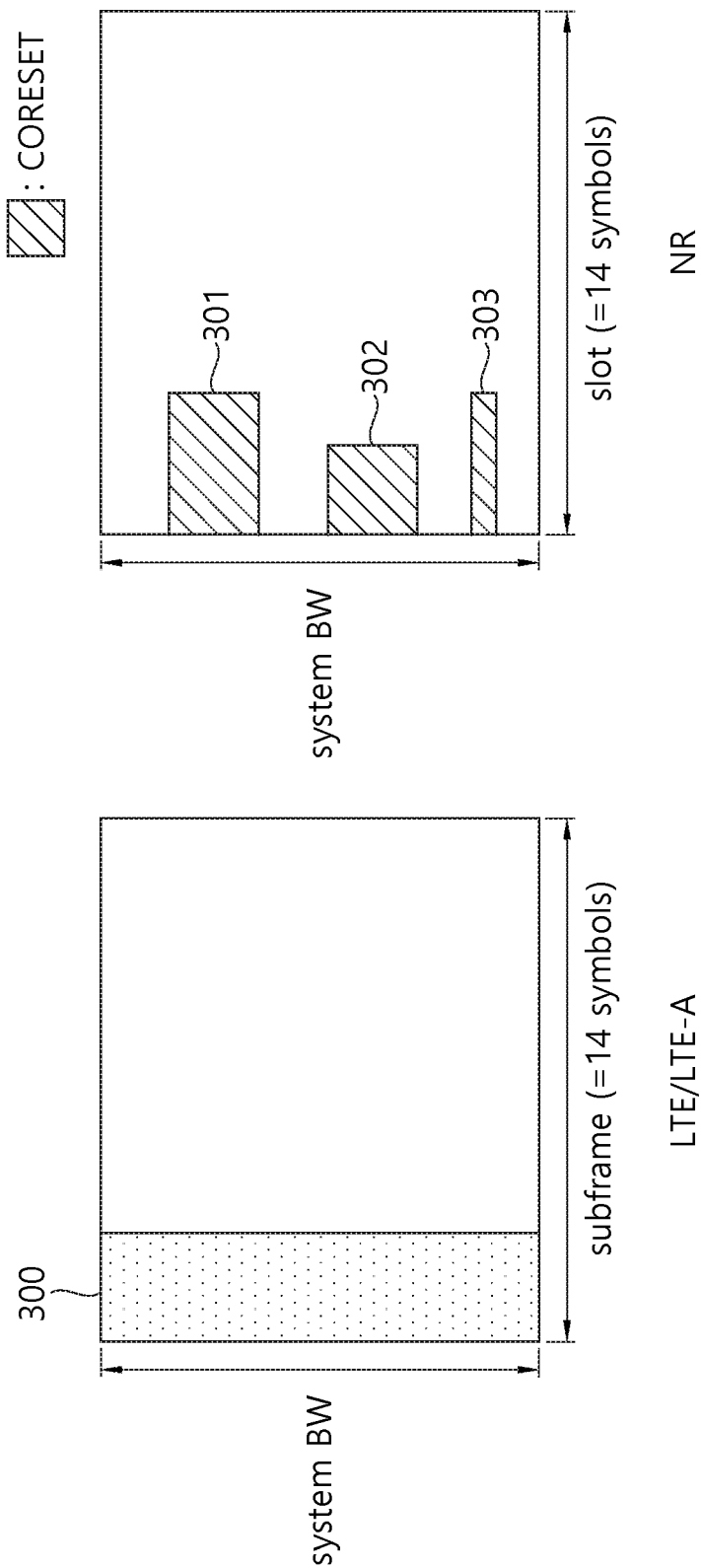
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 6, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 8:
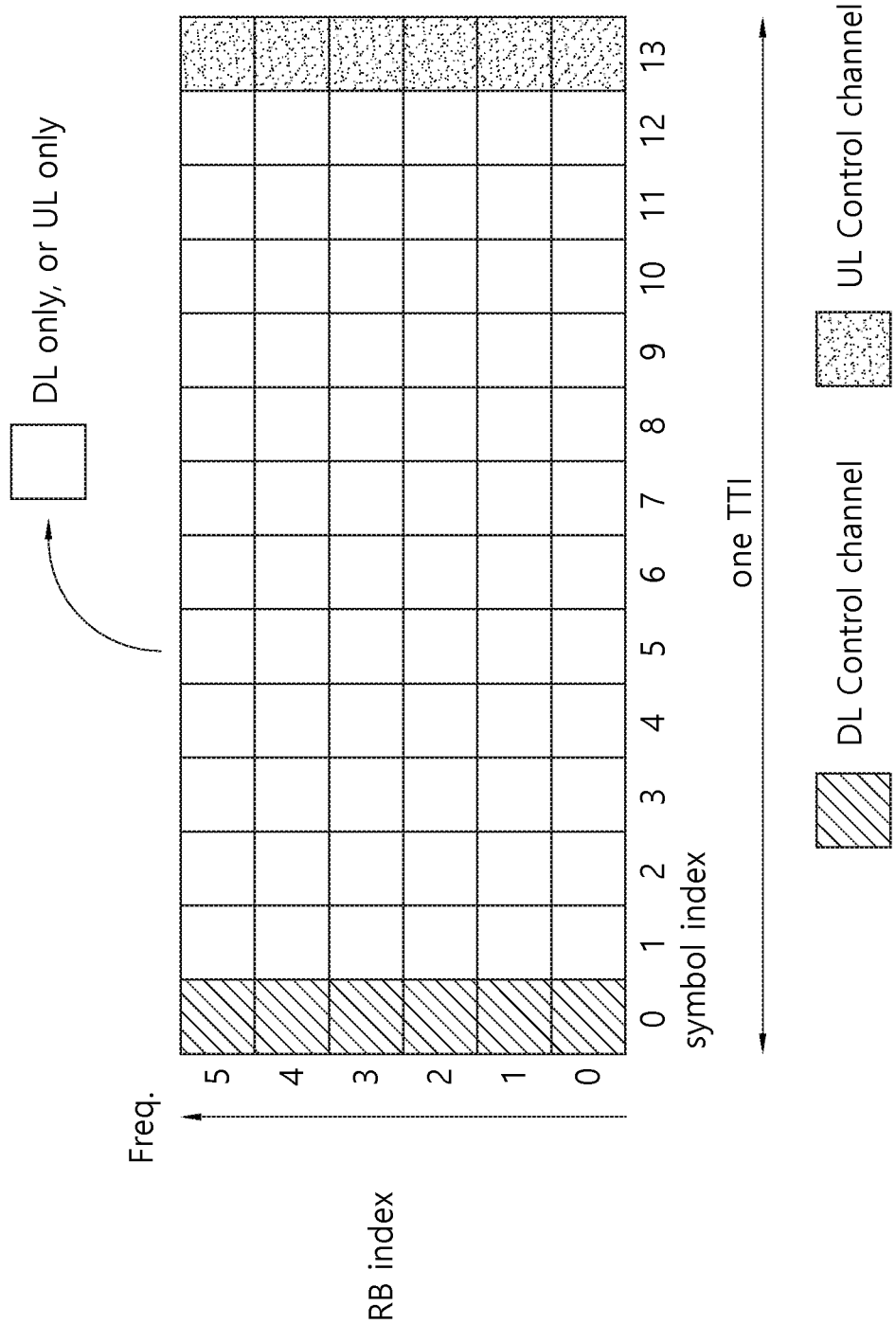
FIG. 8 illustrates an example of a frame structure for new radio access technology.

FIG. 8 illustrates an example of a frame structure for new radio access technology.

In NR, a structure in which a control channel and a data channel are time-division-multiplexed within one TTI, as shown in FIG. 8, can be considered as a frame structure in order to minimize latency.

In FIG. 8, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 64 antenna elements can be installed in the form of a 2-dimensional array at an interval of 0.5 lambda (wavelength) in a panel of 4×4 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

In NR, when a plurality of antennas is used, hybrid beamforming as a combination of digital beamforming and analog beamforming may be used.

Here, analog beamforming (or RF beamforming) refers to a precoding (or combining) operation performed by an RF terminal. In hybrid beamforming, each of a baseband terminal and an RF terminal performs precoding (or combining), thus achieving performance comparable to that in digital beamforming while reducing the number of RF chains and the number of D/A (A/D) converters.

Figure 9:
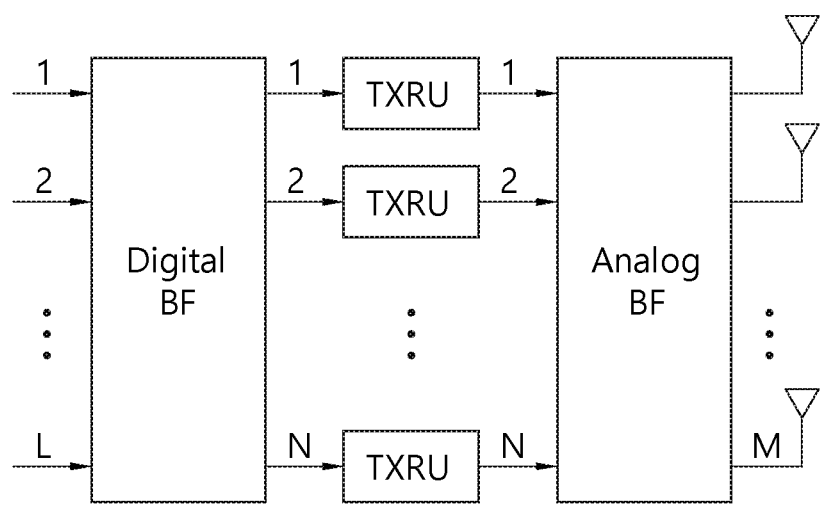
FIG. 9 schematically illustrates a hybrid beamforming structure from the perspective of a TXRU and a physical antenna.

FIG. 9 schematically illustrates a hybrid beamforming structure from the perspective of a TXRU and a physical antenna.

A hybrid beamforming structure may be expressed by N transceiver units (TXRUs) and M physical antennas. Accordingly, digital beamforming for L data layers to be transmitted by a transmission terminal may be expressed by an N-by-L matrix, and N subsequently converted digital signals are converted into analog signals via the TXRUs and are then subjected to analog beamforming expressed by an M-by-N matrix.

An NR system considers a design that enables a BS to change analog beamforming for each symbol, thus supporting efficient beamforming for a UE located in a particular area. Further, when N particular TXRUs and M particular RF antennas are defined as one antenna panel in FIG. 9, the NR system also considers adopting a plurality of antennas panels to independently apply hybrid beamforming.

As described above, when a BS uses a plurality of analog beams, different analog beams may be favorable for signal reception depending on UEs, and thus beam sweeping, which enables the BS to change a plurality of analog beams to be applied per symbol in a particular subframe (SF) so that all UEs have reception opportunities, is taken into consideration at least for a synchronization signal, system information, and a paging message.

Figure 10:
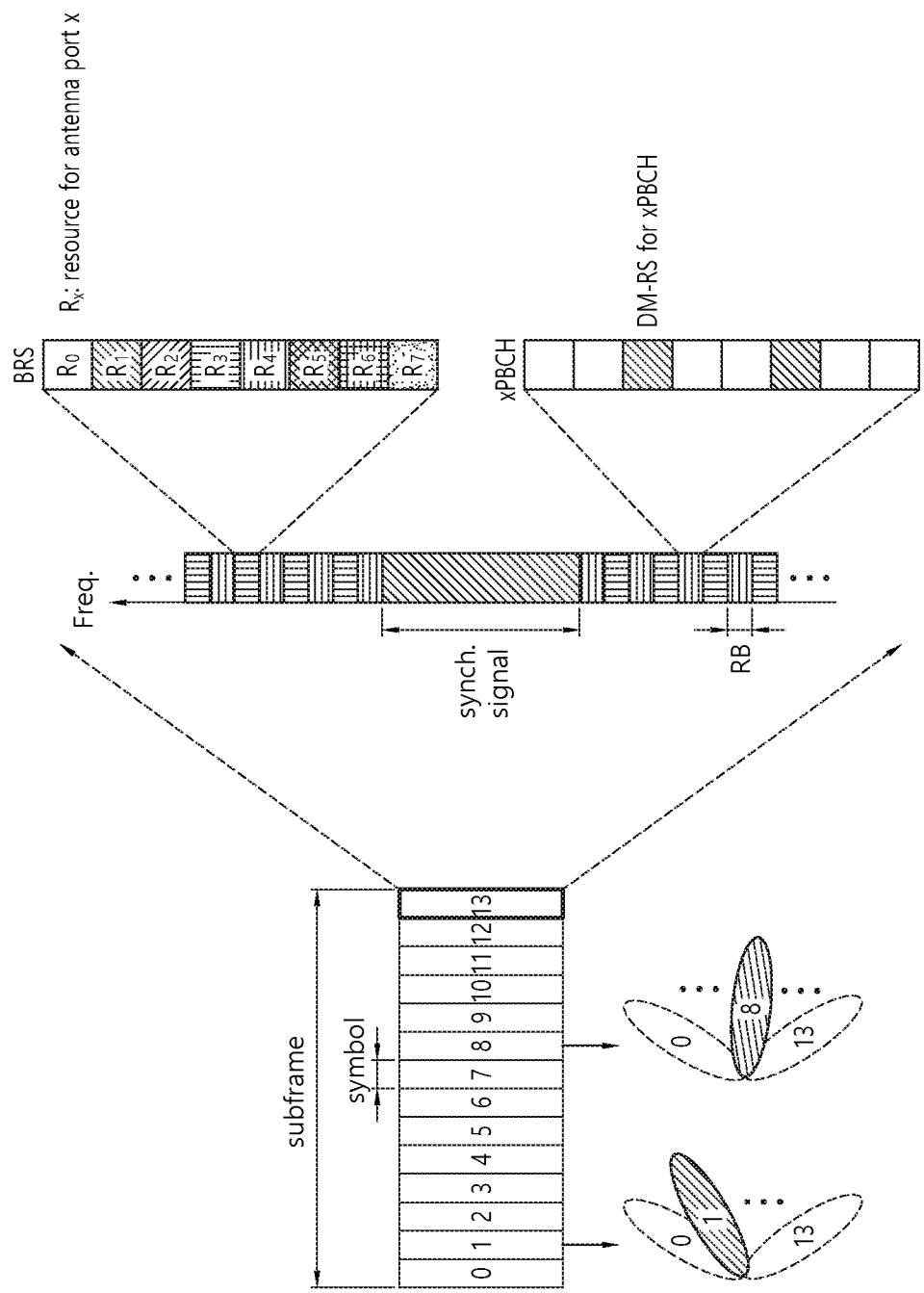
FIG. 10 illustrates beam sweeping for a synchronization signal and system information in downlink (DL) transmission.

FIG. 10 illustrates beam sweeping for a synchronization signal and system information in downlink (DL) transmission.

In FIG. 10, a physical resource (or physical channel) for broadcasting system information of an NR system is referred to as a xPBCH (physical broadcast channel). Here, analog beams belonging to different antenna panels within one symbol may be simultaneously transmitted, and a method of adopting a beam reference signal (BRS), which is a reference signal (RS) transmitted by applying a single analog beam (corresponding to a particular antenna panel), as illustrated in FIG. 10 is under discussion in order to measure a channel per analog beam. The BRS may be defined for a plurality of antenna ports, and each antenna port of the BRS may correspond to a single analog beam. Here, unlike the BRS, a synchronization signal or xPBCH may be transmitted by applying all analog beams in an analog beam group so that any UE can properly receive the synchronization signal or xPBCH.

[Radio Resource Management (RRM) Measurement in LTE]

LTE system supports RRM operations including power control, scheduling, cell search, cell reselection, handover, radio link or connection monitoring, connection establish/re-establish, etc. Here, Serving Cell may request RRM measurement information which includes measurement values for performing RRM operation to UE, and, typically in LTE system UE may measure and report cell search information per cell, RSRP (reference signal received power), RSRQ (reference signal received quality) and so on.

Specifically, in LTE system, UE receives a higher layer signaling 'measConfig' for RRM measurement from a serving cell. The UE measures RSRP or RSRQ based on information in 'measConfig'. Here, definitions of RSRP and RSRP are shown as below.

RSRP may be defined as the linear average of power contributions of resource elements that carry a cell-specific reference signal within a considered measurement frequency bandwidth.

RSRQ may be defined as NxRSRP/(E-UTRA carrier RSSI), where N is the number of resource blocks of an E-UTRA carrier RSSI measurement bandwidth.

RSSI refers to received wideband power including thermal noise and noise within a measurement bandwidth.

According to the foregoing definitions, the UE operating in the LTE system may be allowed to measure RSRP in a bandwidth corresponding to one of 6, 15, 25, 50, 75, and 100 resource blocks (RBs) through an information element (IE) about an allowed measurement bandwidth transmitted via system information block type 3 (SIB3) in intra-frequency measurement or through an IE about an allowed measurement bandwidth transmitted via SIB5 in inter-frequency measurement, or may measure RSRP by default in the entire DL system frequency bandwidth in the absence of the IE.

Here, when the UE receives an allowed measurement bandwidth, the UE may regard the relevant value as the maximum measurement bandwidth and may arbitrarily measure an RSRP value within the value. However, when the serving cell transmits an IE defined as WB-RSRQ and sets an allowed measurement bandwidth to 50 RBs or greater, the UE needs to calculate an RSRP value in the entire allowed measurement bandwidth. The UE measures RSSI in the frequency bandwidth of a receiver of the UE according to the definition of an RSSI bandwidth.

Hereinafter, the disclosure will be described.

The disclosure proposes a method for allocating a PUCCH resource for aperiodic state information (A-CSI) transmission and a UE operation in case of a collision between a PUCCH for A-CSI transmission and a different uplink (UL) physical channel (e.g., a PUCCH and a PUSCH) when a BS indicates A-CSI reporting using a PUCCH resource (e.g., a short PUCCH resource) to a UE through downlink control information (DCI) in a wireless communication system including the BS and the UE.

Hereinafter, in the disclosure, a PUCCH may refer to a physical channel transmitting uplink control information (UCI), and a PUSCH may refer to a physical channel transmitting data. However, the PUSCH may transmit only uplink control information or may transmit uplink control information and data together.

Recently, the 3GPP is considering network slicing for configuring a plurality of logical networks on a single physical network in an NR system, which is a 5G wireless communication system. The logical networks need to be able to support services having various requirements (e.g., enhanced mobile broadband (eMBB), massive machine-type communications (mMTC), ultra-reliable low-latency communications (URLLC), and the like). In a physical layer of the NR system, a method for supporting orthogonal frequency division multiplexing (OFDM) that allows variable numerology according to the various services is being considered. That is, in the NR system, OFDM (or a multiple access scheme) that enables each time and frequency resource region to have independent numerology may be considered.

In the NR system, a method under discussion is that a basic time unit for data scheduling is defined as a slot including a plurality of OFDM symbols and a PUCCH, which is a physical channel for transmitting a UL control signal, is transmitted within a relatively short time interval by time-division multiplexing (TDM) with data channel as illustrated in FIG. 8 in order to reduce latency in transmitting an HARQ-ACK (or information indicating the result of decoding data) in the slot.

Hereinafter, in the disclosure, for convenience of description, a PUCCH transmitted in a short time interval corresponding to a few (e.g., one or two) OFDM symbols in a slot illustrated above is referred to as a short PUCCH. The short PUCCH may have a length of one or two symbols in the time domain. A UE may determine an HARQ-ACK of DL data (or information indicating the result of decoding the DL data, which applies the same hereinafter) in the same slot and may then report the HARQ-ACK to a BS through a short PUCCH in back OFDM symbols in the same slot.

When the information amount of uplink control information (UCI) to be transmitted via the short PUCCH is small (e.g., one or two bits), the BS may allocate a sequence set including a plurality of sequences to the UE as a short PUCCH resource, and the UE may select and transmit a specific sequence corresponding to UCI to be transmitted from among the sequences allocated as the short PUCCH resource. Here, the sequence may be designed to satisfy a low peak-to-average power ratio (PAPR). Hereinafter, for convenience of description, a short PUCCH structure based on a sequence illustrated above may be referred to as a SEQ-PUCCH.

When the information amount of the UCI to be transmitted via the short PUCCH is large (e.g., three bits or more), the BS may allocate a short PUCCH resource including resource elements (REs) for transmitting the UCI and REs for transmitting a reference signal (RS) to the UE. Here, the REs for transmitting the RS and the REs for transmitting the UCI may be divided per symbol according to frequency-division multiplexing (FDM). The UE may generate coded bits of the UCI and may then transmit modulated symbols of the coded bits through the REs for transmitting the UCI. Hereinafter, for convenience of description, a short PUCCH structure to which FDM is applied (per symbol) between an RS and UCI illustrated above may be referred to as an FDM-PUCCH.

Hereinafter, a PUCCH resource may refer to a short PUCCH resource. That is, a short PUCCH resource may be referred to simply as a PUCCH resource for convenience.

In the NR system, HARQ-ACK information, which is the result of decoding DL data, and/or a scheduling request (SR), which is a UL data scheduling request, may be transmitted through a PUCCH resource. In addition, a method for transmitting aperiodic CSI (hereinafter, A-CSI), which is non-periodic channel state information, through a PUCCH resource is also considered.

Here, the DCI indicating the A-CSI report may be a DL assignment scheduling DL data or a UL grant scheduling UL data. The disclosure relates to a PUCCH resource allocation method for transmitting the A-CSI via a PUCCH resource and a UE operation in case of a collision between the PUCCH for transmitting the A-CSI and a different PUCCH or a PUSCH.

Hereinafter, in the disclosure, it is assumed that the BS can instruct, through DCI (e.g., DL assignment or UL grant), the UE to transmit a report on A-CSI about one or more CSI processes, for example, a set of a reference signal (RS) for channel measurement and a resource element (RE) for interference measurement, via a PUCCH resource.

Hereinafter, in the disclosure, a PUCCH resource may include information on PUCCH transmission time (e.g., a starting slot and a starting symbol), PUCCH duration (e.g., the number of symbols in a slot), a physical resource block (PRB) allocation (e.g., a starting PRB index and the number of PRBs), frequency hopping enabling/disabling, a code-domain resource (e.g., an initial cyclic shift, a time-domain orthogonal cover code (OCC), and a pre-DFT OCC), and the like.

In the description below, DL assignment may mean DL assignment DCI, and UL grant may mean UL grant DCI. That is, DL assignment may mean DCI scheduling downlink data transmission, and UL grant may be DCI scheduling uplink data transmission.

<(Short) PUCCH Resource Allocation for A-CSI>

1. A-CSI Report Triggered by UL Grant

[Proposed Method #1] When the BS configures one or more CSI processes for the UE through a higher-layer signal (RRC message, system information block, or the like) and indicates A-CSI reporting about one of the processes to the UE through specific DCI (e.g., a UL grant), the BS may indicate a PUCCH for the UE to transmit the A-CSI by at least one of the following various options.

(1) Option 1: A single PUCCH resource is configured via a higher-layer signal.

For example, the UE may transmit the A-CSI using the configured PUCCH resource depending on whether the A-CSI is triggered in DCI.

(2) Option 2: A single PUCCH resource set is configured via a higher-layer signal.

A. A PUCCH resource to be used in the PUCCH resource set for the A-CSI may be determined based on a DCI indication and/or the UCI payload size and/or a CSI process for which the A-CSI reporting is performed.

For example, the UE may transmit the A-CSI using a PUCCH resource indicated by DCI in the configured PUCCH resource set depending on whether the A-CSI is triggered in the DCI.

(3) Option 3: A plurality of PUCCH resource sets is configured via a higher-layer signal (e.g., RRC signaling).

Method A. Here, a PUCCH resource set to be selected from among the PUCCH resource sets for the A-CSI may be determined based on at least one of a higher-layer signal (e.g., MAC CE type), the UCI payload size, a CSI process for which the A-CSI reporting is performed. Subsequently, a PUCCH resource to be used in the selected PUCCH resource set for the A-CSI may be determined based on a DCI indication and/or the UCI payload size and/or the CSI process for which the A-CSI reporting is performed.

Figure 11:
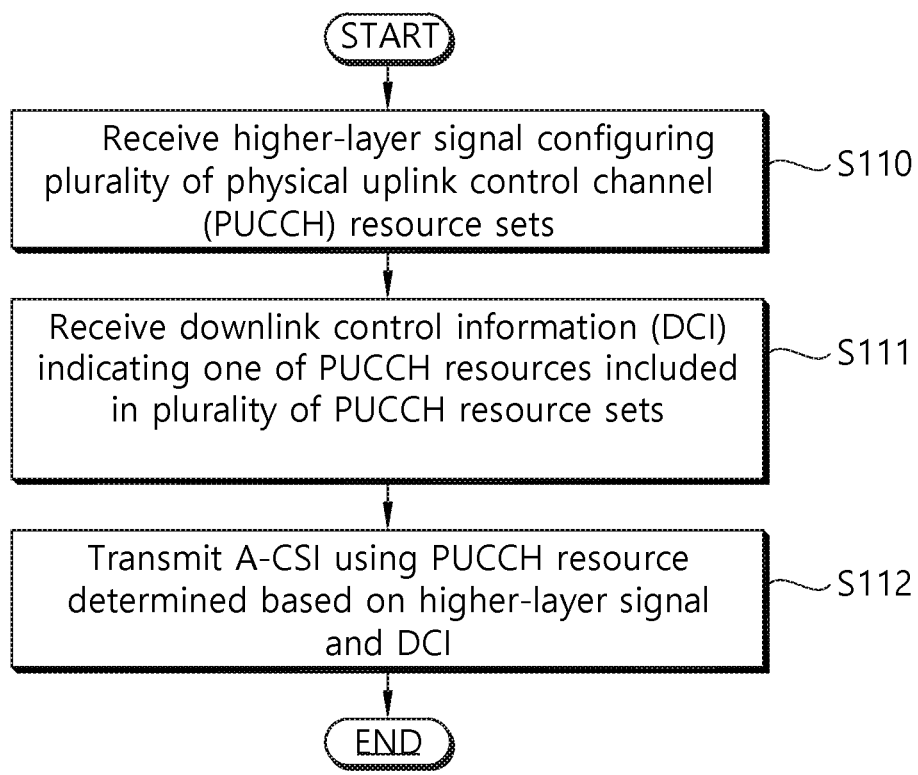
FIG. 11 illustrates an example of a method for a UE to transmit A-CSI according to Method A of Option 3 described above.

FIG. 11 illustrates an example of a method for a UE to transmit A-CSI according to Method A of Option 3 described above.

Referring to FIG. 11, the UE receives a higher-layer signal for configuring a plurality of physical uplink control channel (PUCCH) resource sets (S110).

The higher-layer signal may vary, for example, an RRC message or a system information block.

The following table illustrates an example of an RRC message (signal) for configuring a plurality of PUCCH resource sets.

TABLE 4

-- ASN1START
-- TAG-PUCCH-CONFIG-START
PUCCH-Config::=            SEQUENCE {

TABLE 4-continued

```
resourceSetToAddModList          SEQUENCE (SIZE (1..maxNrofPUCCH-ResourceSets))
  OF PUCCH-ResourceSet             OPTIONAL, -- Need N
resourceSetToReleaseList           SEQUENCE (SIZE (1..maxNrofPUCCH-ResourceSets)) OF
  PUCCH-ResourceSetId              OPTIONAL, -- Need N
resourceToAddModList               SEQUENCE (SIZE (1..maxNrofPUCCH-Resource)) OF
  PUCCH-Resource                   OPTIONAL, -- Need N
resourceToReleaseList              SEQUENCE (SIZE (1..maxNrofPUCCH-Resources)) OF
  PUCCH-ResourceId                 OPTIONAL, -- Need N
  ...
PUCCH-ResourceSet ::=              SEQUENCE {
  pucch-ResourceSetId                PUCCH-ResourceSetId,
  resourceList                     SEQUENCE (SIZE (1..maxNrofPUCCH-ResourcesPerSet)) OF
  PUCCH-ResourceId,
  maxPayloadMinus1                   INTEGER (4..256)
OPTIONAL -- Need R
}
PUCCH-ResourceSetId ::=            INTEGER (0..maxNrofPUCCH-ResourceSets-1)
PUCCH-Resource ::=                 SEQUENCE {
  pucch-ResourceId                   PUCCH-ResourceId,
  startingPRB                        PRB-Id,
  intraSlotFrequencyHopping          ENUMERATED { enabled }
OPTIONAL, -- Need R
  secondHopPRB                       PRB-Id
OPTIONAL, -- Need R
  format                             CHOICE {
    format0                            PUCCH-format0,
    format1                            PUCCH-format1,
    format2                            PUCCH-format2,
    format3                            PUCCH-format3,
    format4                            PUCCH-format4
  }
}
PUCCH-ResourceId ::=               INTEGER (0..maxNrofPUCCH-Resources-1)
...
```

In the above table, 'resourceSetToAddModList' may include 'PUCCH-ResourceSet' as many as 'maxNrof-PUCCH-ResourceSets'. Each 'PUCCH-ResourceSet' may include 'resourceList' including a plurality of PUCCH resources. Each PUCCH resource may include 'pucch-ResourceId', 'startingPRB', hopping-related information, format-related information, and the like.

For example, the higher-layer signal may configure a first PUCCH resource set and a second PUCCH resource set. The first PUCCH resource set may include one or more PUCCH resources. The second PUCCH resource set may also include one or more PUCCH resources. Although this example shows that two PUCCH resource sets are configured, which is merely for understanding, it is obvious that three or more PUCCH resource sets can be configured.

The UE receives downlink control information (DCI) indicating one of PUCCH resources included in the plurality of PUCCH resource sets (S111). The DCI may be received through a PDCCH. The DCI may be a UL grant scheduling uplink transmission of the UE. The UE transmits A-CSI using a PUCCH resource determined based on the higher-layer signal and the DCI (S112).

Specifically, the UE selects one PUCCH resource set from among the plurality of PUCCH resource sets based on a CSI process for which the A-CSI is transmitted. For example, the UE may select one of the first PUCCH resource set and the second PUCCH resource set according to the ID of the CSI process. Although an example of selecting a PUCCH resource set based on a CSI process (ID) is illustrated herein, the UE may select one of the plurality of PUCCH resource sets based on the payload size of UCI to be transmitted by the UE and information indicated by the DCI.

Subsequently, the UE may transmit the A-CSI using any one PUCCH resource indicated by the DCI among PUCCH resources included in the selected one PUCCH resource set. Accordingly, it can be considered that the PUCCH resource actually used for transmitting the A-CSI is determined based on the higher-layer signal and the DCI. Although an example in which the DCI indicates the one PUCCH resource is illustrated herein, the PUCCH resource may be selected based on the CSI process and the payload size of the UCI to be transmitted by the UE. Each of the PUCCH resources included in the plurality of PUCCH resource sets may be a short PUCCH resource including one or two symbols in a slot in the time domain.

In the above example, the CSI process may refer to a set of a reference signal (RS) and a resource element (RE) for CSI measurement for a specific cell (or transmission point or beam).

Method B. For example, the UE may select one of the plurality of configured PUCCH resource sets and may transmit the A-CSI using a PUCCH resource indicated by DCI in the selected PUCCH resource set depending on whether the A-CSI is triggered in the DCI.

Figure 12:
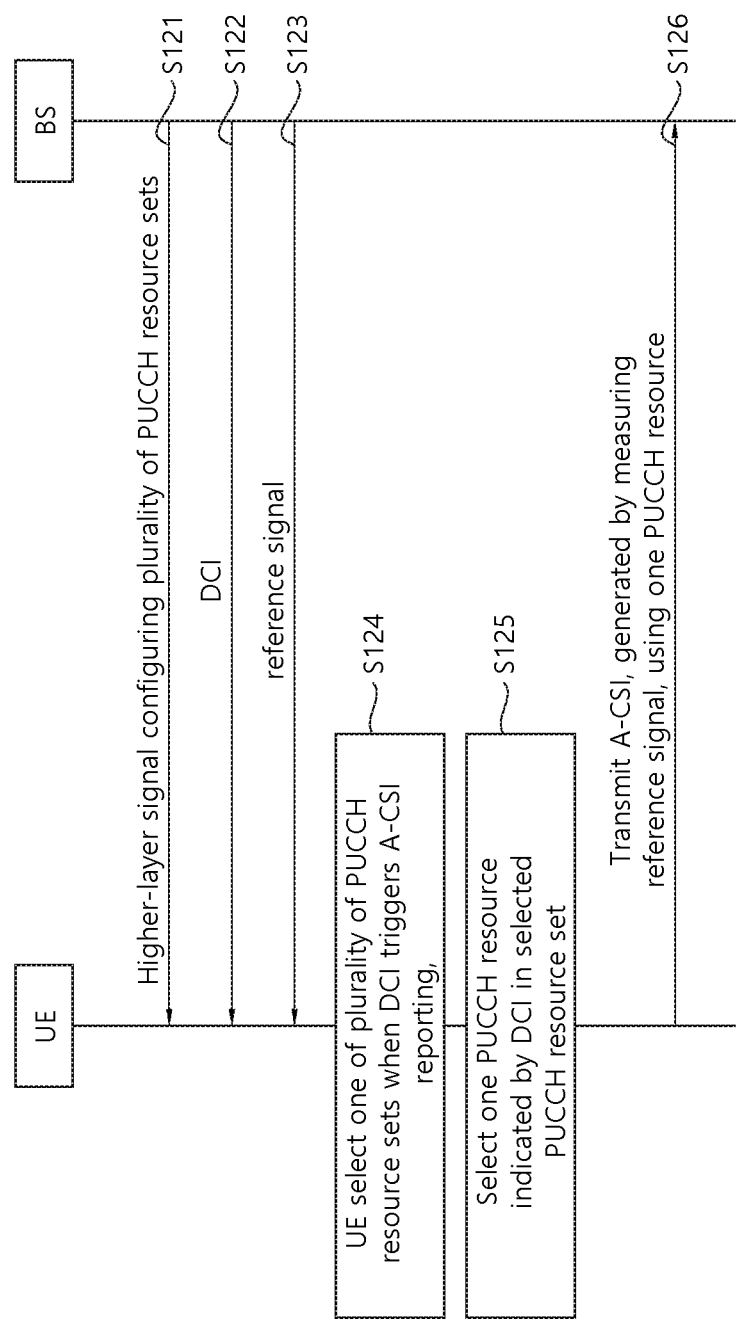
FIG. 12 illustrates an example of a method for a UE to transmit A-CSI according to Method B of Option 3 described above.

FIG. 12 illustrates an example of a method for a UE to transmit A-CSI according to Method B of Option 3 described above.

Referring to FIG. 12, the UE receives a higher-layer signal for configuring a plurality of physical uplink control channel (PUCCH) resource sets (S121).

The higher-layer signal may vary, for example, an RRC message or a system information block.

The UE receives DCI (S122). The UE receives a reference signal from a BS (S123). The reference signal may be, for example, a channel state information reference signal (CSI-RS).

When the DCI triggers A-CSI reporting, the UE selects one of the plurality of PUCCH resource sets (S124). That is, the UE may select one of the plurality of PUCCH resource sets according to whether the DCI triggers A-CSI reporting.

The UE selects one PUCCH resource indicated by the DCI from the selected PUCCH resource set (S125) and transmits A-CSI, generated by measuring the reference signal, using the one PUCCH resource (S126).

In Options 1, 2, and 3, the PUCCH resource may be configured separately from configuring the CSI process or may be configured for each CSI process (group). In the latter case, the PUCCH resource (set) for A-CSI transmission may be interpreted differently according to a CSI process indicated by the BS.

The PUCCH resource(s) for A-CSI transmission may be configured independently of a PUCCH resource(s) configured for HARQ-ACK transmission or may be configured with a particular resource(s) in the PUCCH resource(s) configured for HARQ-ACK transmission.

When A-CSI reporting is indicated through a DL assignment, DCI fields involved in selecting a PUCCH resource for each of A-CSI and an HARQ-ACK may be independently configured.

Information on A-CSI transmission time may also be included in the PUCCH resource or may be configured via a separate higher-layer signal.

The BS may instruct the UE to follow a specific operation among the foregoing options through a higher-layer signal and/or DCI.

'1. Triggering of A-CSI reporting by UL grant' is summarized as follows.

In an NR system according to an embodiment of the disclosure, the following method is considered as a PUCCH resource allocation method for HARQ-ACK transmission. The BS may configure in advance a plurality of PUCCH resource sets per UCI payload size range, and the UE may select one PUCCH resource set according to the payload size of an HARQ-ACK to be reported. Subsequently, the BS may indicate a PUCCH resource to be actually used by the UE in the selected PUCCH resource set through a particular DCI field in a DL assignment.

In particular, when A-CSI reporting is indicated through a UL grant, a PUCCH resource allocation method for A-CSI reporting may be similar to the above method so that the BS may configure in advance a plurality of PUCCH resource sets per UCI payload size range, and the UE may transmit A-CSI using one PUCCH resource indicated by the payload size of the A-CSI to be reported and DCI (Option 3).

Alternatively, since a UCI payload size range expected for A-CSI reporting is relatively small, the PUCCH resource allocation method for A-CSI reporting may not need to have as various PUCCH resource candidates as the PUCCH resource allocation method for an HARQ-ACK. In this case, the BS may configure a single PUCCH resource set for A-CSI transmission for the UE via a higher-layer signal (Option 2). If a field indicating a PUCCH resource for A-CSI transmission in the UL grant is considered unnecessary, the BS may configure only a single PUCCH resource for A-CSI transmission (Option 1). In the above methods (options), a PUCCH resource (or resource set) for A-CSI transmission may be configured per CSI process or may be configured independently of a CSI process (i.e., is applied commonly to any CSI process).

Proposed Method #1 may be applied in a combination with other proposed methods of the disclosure unless incompatible therewith.

2. A-CSI Report Triggered by DL Assignment

[Proposed Method #2] The BS may configure one or more CSI processes for the UE through a higher-layer signal and may indicate A-CSI reporting about one of the processes to the UE through a DL assignment. Further, the BS may configure a PUCCH resource set(s) for HARQ-ACK transmission through a higher-layer signal and may then indicate a PUCCH resource for HARQ-ACK transmission in the selected PUCCH resource set by the (same) DL assignment (according to a specific method). Here, the BS may indicate a PUCCH for the UE to transmit the A-CSI by at least one of the following various options.

(1) Option 1: The BS may indicate transmission (of an HARQ-ACK and CSI together) using the PUCCH resource for HARQ-ACK transmission.

A. Here, a PUCCH resource to be used among PUCCH resources for the HARQ-ACK may be determined based on a combination of the total UCI payload size of the HARQ-ACK and CSI and a DCI indication.

i. For example, when a plurality of PUCCH resource sets for the HARQ-ACK is configured through a higher-layer signal according to the range of the UCI payload size, one PUCCH resource set may be selected based on the total UCI payload size of the HARQ-ACK and the CSI. Subsequently, a PUCCH to be actually used in the (selected) PUCCH resource set may be indicated by a specific DCI field in the DL assignment (triggering A-CSI). The DCI field may be the same as a DCI field indicating a PUCCH resource for the HARQ-ACK when only the HARQ-ACK is transmitted.

(2) Option 2: The BS may configure a single PUCCH resource for A-CSI transmission corresponding to each PUCCH resource set for HARQ-ACK transmission through a higher-layer signal.

A. A PUCCH resource for the HARQ-ACK may be selected by the same process as for transmitting only the HARQ-ACK.

B. A PUCCH resource to be used among PUCCH resources for the A-CSI may be implicitly determined based on a selected PUCCH resource set for the HARQ-ACK. That is, a PUCCH resource for the A-CSI corresponding to the selected PUCCH resource set for the HARQ-ACK is used.

(3) Option 3: The BS may configure a single PUCCH resource for A-CSI transmission corresponding to each PUCCH resource for HARQ-ACK transmission through a higher-layer signal.

Figure 13:
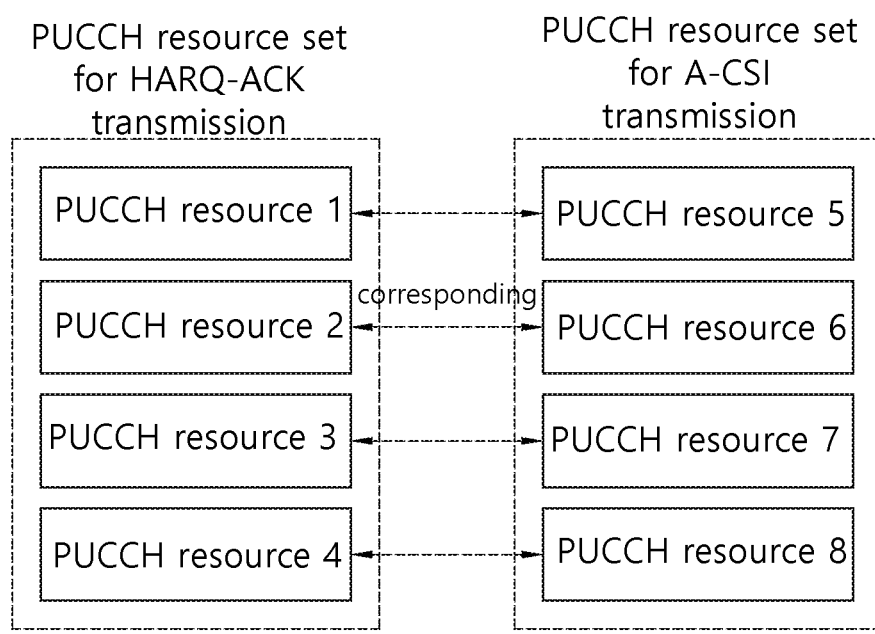
FIG. 13 illustrates a single PUCCH resource for A-CSI transmission corresponding to each PUCCH resource for HARQ-ACK transmission according to Option 3.

FIG. 13 illustrates a single PUCCH resource for A-CSI transmission corresponding to each PUCCH resource for HARQ-ACK transmission according to Option 3.

Referring to FIG. 13, a PUCCH resource set for HARQ-ACK transmission may include a first PUCCH resource, a second PUCCH resource, a third PUCCH resource, and a fourth PUCCH resource. In this case, the first PUCCH resource may correspond to a fifth PUCCH resource, and the fifth PUCCH resource may be a PUCCH resource for A-CSI transmission. Likewise, the second PUCCH resource may correspond to a sixth PUCCH resource, the third PUCCH resource may correspond to a seventh PUCCH resource, and the fourth PUCCH resource may correspond to an eighth PUCCH resource. This corresponding relationship may be set in advance by a higher-layer signal, such as an RRC signal.

A. A PUCCH resource for the HARQ-ACK may be selected by the same process as for transmitting only the HARQ-ACK.

B. A PUCCH resource to be used among PUCCH resources for the A-CSI may be implicitly determined based on a selected PUCCH resource for the HARQ-ACK. That is, a PUCCH resource for the A-CSI corresponding to the selected PUCCH resource for the HARQ-ACK is used.

Figure 14:
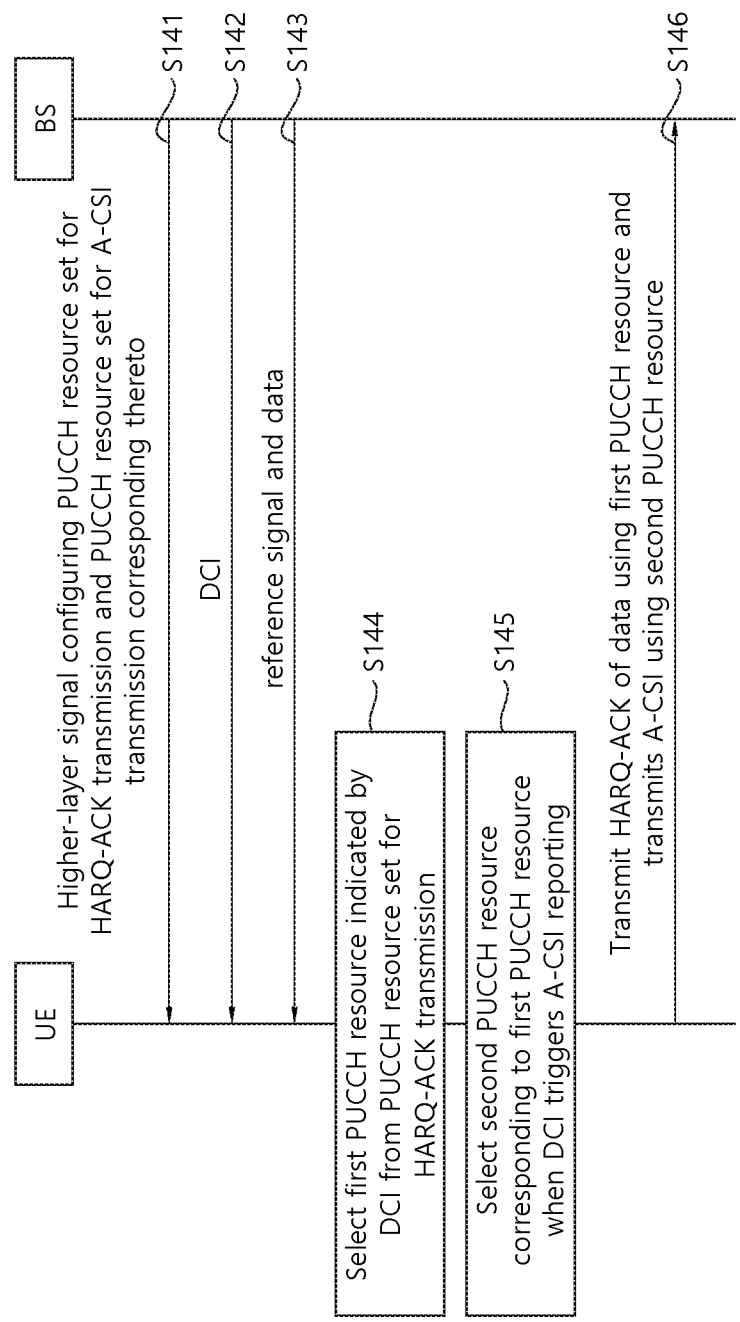
FIG. 14 illustrates an A-CSI transmission method of a UE according to B of Option 3.

FIG. 14 illustrates an A-CSI transmission method of a UE according to B of Option 3.

Referring to FIG. 14, the UE receives a higher-layer signal configuring a PUCCH resource set for HARQ-ACK transmission and a plurality of PUCCH resource sets for A-CSI transmission corresponding to the PUCCH resource set for HARQ-ACK transmission (S141).

Although not shown in FIG. 14, one or more CSI processes may be configured for the UE through the higher-layer signal.

The higher-layer signal may vary, for example, an RRC message or a system information block.

The UE receives DCI (S142). The DCI may trigger A-CSI reporting for one of the one or more CSI processes. Further, the DCI may indicate any one PUCCH resource for HARQ-ACK transmission in the PUCCH resource set for HARQ-ACK transmission.

The UE receives a reference signal and data from a BS (S143). The reference signal may be, for example, a channel state information reference signal (CSI-RS).

The UE selects a first PUCCH resource indicated by the DCI from the PUCCH resource set for HARQ-ACK transmission (S144), and selects a second PUCCH resource (corresponding to the fifth PUCCH resource in FIG. 13) corresponding to the first PUCCH resource when the DCI triggers the A-CSI reporting (S145).

The UE transmits an HARQ-ACK of the data using the first PUCCH resource and transmits A-CSI using the second PUCCH resource (S146).

(4) Option 4: The BS may configure a PUCCH resource set for transmitting an HARQ-ACK and A-CSI together separately from that for transmitting only an HARQ-ACK through a higher-layer signal.

A. Each element in the PUCCH resource set for transmitting the HARQ-ACK and the A-CSI together (e.g., a PUCCH resource set for simultaneously transmitting the HARQ-ACK and the A-CSI) may be a single PUCCH resource for loading the result of jointly coding the HARQ-ACK and the A-CSI or a pair of two PUCCH resources subjected to TDM for respectively loading the results of separately coding the HARQ-ACK and the A-CSI.

Figure 15:
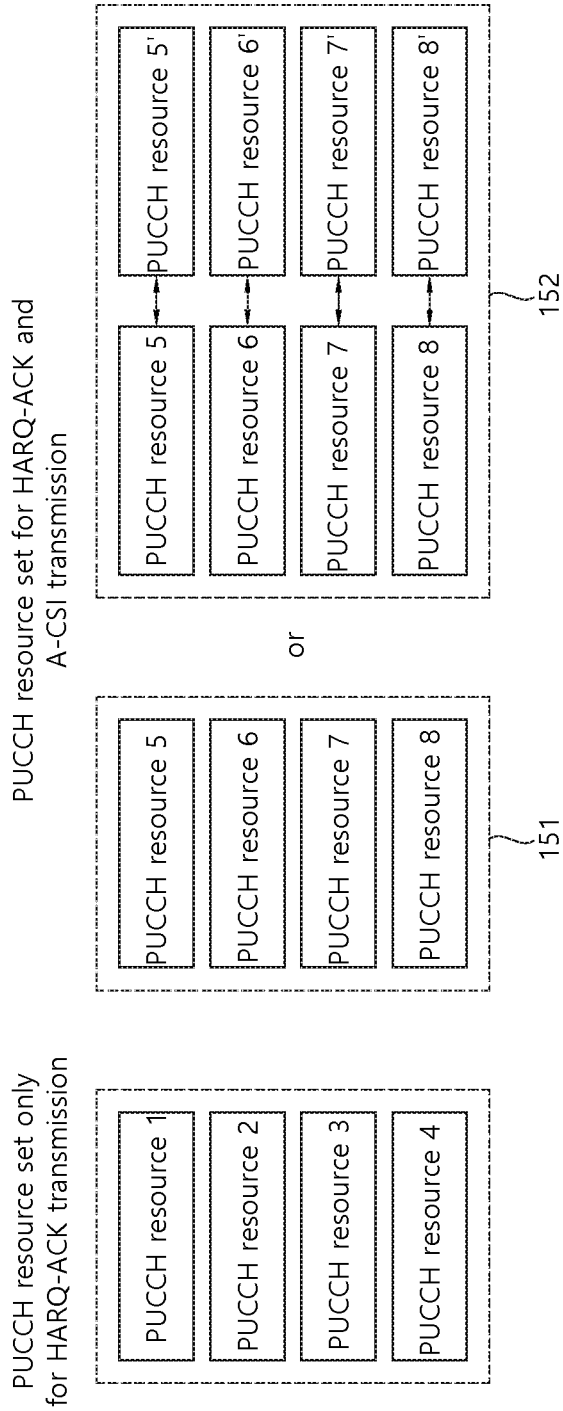
FIG. 15 illustrates a case in which a set of PUCCH resources for transmitting only an HARQ-ACK and a set of PUCCH resources for transmitting an HARQ-ACK and A-CSI are separately configured.

FIG. 15 illustrates a case in which a set of PUCCH resources for transmitting only an HARQ-ACK and a set of PUCCH resources for transmitting an HARQ-ACK and A-CSI are separately configured.

Each element in the set of the PUCCH resources for transmitting the HARQ-ACK and the A-CSI may include one PUCCH resource as illustrated in 151 of FIG. 15 or may include a pair of two PUCCH resources subjected to TDM for loading the result of separately coding an HARQ-ACK and A-CSI as illustrated in 152 of FIG. 15. For example, in 152 of FIG. 15, PUCCH resources 5, 6, 7, and 8 are sequentially paired with PUCCH resources 5', 6', 7', and 8', and PUCCH resources of one pair are subjected to TDM to each other. Here, for example, an HARQ-ACK may be transmitted via PUCCH resources 5, 6, 7, and 8, and A-CSI may be transmitted PUCCH resources 5', 6', 7', and 8.

B. A PUCCH resource set for the HARQ-ACK and a PUCCH resource set for simultaneously transmitting the HARQ-ACK and the A-CSI may be independently configured for each HARQ-ACK payload size (or total UCI payload size) range of a plurality of HARQ-ACK payload size (or total UCI payload size) ranges.

C. A PUCCH resource to be used among PUCCH resources for simultaneously transmitting the HARQ-ACK and the A-CSI may be determined based on a combination of the HARQ-ACK payload size (or total UCI payload size) and a DCI indication.

i. For example, when there is no transmission indication for A-CSI reporting, a PUCCH resource set for transmitting only an HARQ-ACK may be selected, and when there is a transmission indication for A-CSI reporting, a PUCCH resource set for simultaneously transmitting an HARQ-ACK and A-CSI may be selected.

The BS may configure a plurality of PUCCH resource sets for simultaneously transmitting an HARQ-ACK and A-CSI in advance for the UE according to the range of an HARQ-ACK payload size (or total UCI payload size) through a higher-layer signal, and the UE may select one PUCCH resource set (for simultaneously transmitting an HARQ-ACK and A-CSI) based on the HARQ-ACK payload size (or the total UCI payload size). Subsequently, a PUCCH resource to be actually used in the (selected) PUCCH resource set may be indicated by a specific DCI field in a DL assignment (triggering A-CSI). Here, the DCI field may be the same as a DCI field indicating a PUCCH resource for HARQ-ACK transmission when only an HARQ-ACK is transmitted.

(5) Option 5: The BS may indicate some of the PUCCH resources for A-CSI transmission in the same manner as for a PUCCH resource for HARQ-ACK transmission and may indicate the remaining resources through additional signaling (e.g., DCI or RRC signaling).

A. A PUCCH resource for the HARQ-ACK may be selected by the same process as for transmitting only the HARQ-ACK.

B. For a PUCCH resource for A-CSI transmission, only frequency-domain and/or code-domain resource allocation is applied the same as for a PUCCH resource selected assuming that an HARQ-ACK having the same UCI payload size as that of A-CSI is transmitted, and time-domain resource allocation information may be indicated through a (additional) DL assignment and/or a higher-layer signal.

C. Here, when transmission times indicated by the PUCCH resource for the HARQ-ACK and the PUCCH resource for the A-CSI selected by processes (5)-A and (5)-B of Proposed Method #2 are the same even in symbol unit, Option 1 may be applied.

Here, the PUCCH resource for the HARQ-ACK (e.g., a PUCCH resource related to the HARQ-ACK) refers to a PUCCH resource configured to transmit an HARQ-ACK but may be a PUCCH resource for transmitting general UCI without being restrictively used for a specific UCI type. Further, the PUCCH resource for the HARQ-ACK may be a short PUCCH resource consisting of two or less symbols or a long PUCCH resource consisting of four or more symbols.

Here, the BS may instruct the UE to follow a particular operation among the foregoing options through a higher-layer signal and/or DCI.

'2. Triggering of A-CSI reporting by DL assignment' is summarized as follows. In an NR system according to an embodiment of the disclosure, the following method is considered as a PUCCH resource allocation method for HARQ-ACK transmission. The BS may configure in advance a plurality of PUCCH resource sets per UCI payload size range, and the UE selects one PUCCH resource set according to the payload size of an HARQ-ACK to be reported. Subsequently, the BS indicates a PUCCH resource to be actually used by the UE in the selected PUCCH resource set through a particular DCI field in a DL assignment. Here, when A-CSI transmission is also indicated through the DL assignment, it is necessary to clarify the relationship between the PUCCH resource for HARQ-ACK transmission and a PUCCH resource for the A-CSI transmission. Preferably, a method of transmitting an HARQ-ACK and A-CSI together via a single PUCCH resource may be considered in order to eliminate additional DCI signaling overhead (Option 1). In this case, the single PUCCH resource may be a PUCCH resource for HARQ-ACK transmission selected assuming that an HARQ-ACK has a total UCI payload size of an HARQ-ACK plus A-CSI.

According to another method, a single PUCCH resource for A-CSI transmission corresponding to each PUCCH resource (or resource set) for HARQ-ACK transmission may be configured through a higher-layer signal, and a PUCCH resource for A-CSI transmission may be implicitly determined depending on which PUCCH resource (or resource set) for HARQ-ACK transmission is selected (Option 2 and Option 3).

Alternatively, a PUCCH resource set may be independently configured for a case of transmitting only an HARQ-ACK and for a case of simultaneously transmitting an HARQ-ACK and A-CSI. Here, a PUCCH resource set for simultaneously transmitting an HARQ-ACK and A-CSI may have a plurality of (e.g., two) PUCCH resources subjected to TDM as elements rather than a single PUCCH resource (Option 4). For the PUCCH resource set for simultaneously transmitting the HARQ-ACK and the A-CSI, similarly to that for an HARQ-ACK, the BS may configure in advance a plurality of PUCCH resource sets per UCI payload size range, and the UE may select one PUCCH resource set according to the payload size of an HARQ-ACK to be reported. The BS may indicate a PUCCH resource to be actually used by the UE in the selected PUCCH resource set through a specific DCI field in (A-CSI-triggering) DCI (or DL assignment).

Alternatively, a PUCCH resource for A-CSI transmission may employ only some resources (e.g., frequency-domain resources) of PUCCH resources for HARQ-ACK transmission. The remaining resources (e.g., time-domain resources) may be independently indicated (e.g., via DCI and/or RRC signaling) (Option 5).

In Proposed Method #2, the following operations may be further considered.

Option A: The BS independently configures a PUCCH resource set for each case depending on CSI reporting on/off (=whether CSI is reported). Here, a PUCCH resource to be used by the UE in the PUCCH resource set may be indicated by an ACK/NACK resource indicator (ARI) field in DCI. Further, whether CSI reporting is on/off and/or a specific CSI process (when CSI reporting is on) may be indicated by a DCI field separate from the ARI field.

Option B: The BS may independently configure a PUCCH resource set for each case according to CSI reporting on/off (=whether CSI is reported). In this case, a PUCCH resource to be used by the UE in the PUCCH resource set and CSI reporting on/off information for each PUCCH resource may be indicated through an ARI field in DCI, that is, through the same DCI field. Whether CSI reporting is on/off and/or a specific CSI process (when CSI reporting is on) may be indicated through a DCI field separate from the ARI field.

Option C: Two PUCCH resource sets for each HARQ-ACK payload size range may be configured. Here, one of the two PUCCH resource set is configured for the case where CSI reporting is on, and the other PUCCH resource set is configured for the case where CSI reporting is off. The UE determines which PUCCH resource set pair depending on the HARQ-ACK payload size (instead of the total UCI payload size).

Option D: The BS configures one PUCCH resource set for each HARQ-ACK payload size and configures whether CSI reporting is on/off for each PUCCH resource. Here, the UE determines which PUCCH resource set depending on the HARQ-ACK payload size (instead of the total UCI payload size).

Further, when the BS allocates a short PUCCH resource for A-CSI transmission through a UL grant (or DL assignment), the following operations may be considered.

Option 1: The BS configures a (plurality of) common PUCCH resource set for the UE through a higher-layer signal regardless of the DL assignment or UL grant and indicates a particular PUCCH resource for A-CSI transmission in the PUCCH resource set through a particular DCI field in the UL grant. Here, the BS may indicate a particular PUCCH resource for HARQ-ACK transmission in the (plurality of) common PUCCH resource set through a particular DCI field in the DL assignment.

Option 2: The BS configures a (single) PUCCH resource for the UE through a higher-layer signal, and the UE transmits A-CSI through the PUCCH resource upon indicating A-CSI transmission by the UL grant (or DL assignment). Here, a separate DCI field for indicating a PUCCH resource for A-CSI transmission may not exist in the UL grant (or DL assignment).

Option 3: The UE transmits A-CSI through a PUCCH resource set or appointed in advance among PUCCH resources configured for an HARQ-ACK upon indicating A-CSI transmission by the UL grant (or DL assignment). Here, a separate DCI field for indicating a PUCCH resource for A-CSI transmission may not exist in the UL grant (or DL assignment).

Proposed Method #2 may be applied in a combination with other proposed methods of the disclosure unless incompatible therewith.

[Proposed Method #3] When a BS indicates an HARQ-ACK transmission PUCCH resource and an A-CSI transmission PUCCH resource to a UE through a higher-layer signal and/or DL assignment, the BS indicates whether to transmit an HARQ-ACK and A-CSI through one PUCCH resource or through two PUCCHs divided on the time axis using one of the following methods.

(1) A particular DCI field (independent of a DCI field for allocating a PUCCH resource for the HARQ-ACK) in the DL assignment for indication.

A. Here, the DCI field may be a field indicating a time-axis offset (e.g., a time offset) value for transmission time between the HARQ-ACK and the A-CSI.

(2) A higher-layer signal (e.g., RRC signaling) is used for indication.

(3) The UE determines whether to use one PUCCH resource or to use two PUCCH resources depending the UCI payload size of the HARQ-ACK and the A-CSI.

Here, when the HARQ-ACK and the A-CSI are transmitted via one PUCCH resource, the UE may transmit the HARQ-ACK and the A-CSI via joint coding. Here, when the HARQ-ACK and the A-CSI are transmitted via two PUCCH resources subjected to TDM, the two PUCCH resources may be resources independently configured in a code domain and/or a frequency domain or may be the same PUCCH resource repeated in different time resources (e.g., repetition).

For example, the BS may indicate, through a specific DCI field in a DL assignment, whether to transmit an HARQ-ACK and A-CSI through a single PUCCH resource or through two PUCCH resources subjected to TDM.

When it is indicated to transmit an HARQ-ACK and A-CSI together through a single PUCCH resource, the UE may operate, for example, according to Option 1 of Proposed Method #2. That is, a plurality of PUCCH resource sets for HARQ-ACK transmission may be configured according to the range of a UCI payload size through a higher-layer signal, and one PUCCH resource set may be selected based on the total UCI payload size of an HARQ-ACK plus CSI. The UE may transmit an HARQ-ACK and A-CSI together using a (single) PUCCH resource, indicated by a specific DCI field in the DL assignment (triggering A-CSI), in the (selected) PUCCH resource set. The DCI field may be the same as a DCI field indicating a PUCCH resource for HARQ-ACK transmission when only an HARQ-ACK is transmitted, and may be a separate field from a DCI field indicating whether TDM is applied to an HARQ-ACK and A-CSI.

When it is indicated to transmit an HARQ-ACK and A-CSI through two PUCCH resources subjected to TDM, the UE may follow a PUCCH resource allocation method for transmitting A-CSI independently of an HARQ-ACK, for example, Proposed Method #1, or may transmit A-CSI using a PUCCH resource that is paired with a PUCCH resource for HARQ-ACK transmission and is subjected to TDM therewith according to Option 2, Option 3, or Option 4 of Proposed Method #2.

Specifically, when operating according to Option 4 of Proposed Method #2], the BS may independently configure a PUCCH resource set for HARQ-ACK transmission and a PUCCH resource set for simultaneously transmitting an HARQ-ACK and A-CSI per HARQ-ACK payload size (or total UCI payload size) range of a plurality of HARQ-ACK payload size (or total UCI payload size) ranges. Here, one element of a PUCCH resource set for simultaneously transmitting an HARQ-ACK and A-CSI may refer to a pair of PUCCH resources subjected to TDM. The BS may configure a plurality of PUCCH resource sets for simultaneously transmitting an HARQ-ACK and A-CSI in advance for the UE according to the range of a HARQ-ACK payload size (or total UCI payload size) through a higher-layer signal. The UE may select one PUCCH resource set (for simultaneously transmitting an HARQ-ACK and A-CSI) based on a HARQ-ACK payload size (or total UCI payload size).

Subsequently, a PUCCH resource to be actually used in the (selected) PUCCH resource set may be indicated by a specific DCI field in the DL assignment (triggering A-CSI). The DCI field may be the same as a DCI field indicating a PUCCH resource for HARQ-ACK transmission when only an HARQ-ACK is transmitted, and may be a separate field from a DCI field indicating whether TDM is applied to an HARQ-ACK and A-CSI.

According to an additional operation of Proposed Method #3, when the BS indicates a particular PUCCH resource in a PUCCH resource set through an ACK/NACK resource indicator (ARI) in the DL assignment, the BS may configure a single PUCCH resource corresponding to one state (or code point) of the ARI through a higher-layer signal and may further configure one of the following pieces of information.

i) Information indicating whether to jointly code and transmit an HARQ-ACK and A-CSI in the PUCCH resource; and ii) information indicating whether to transmit an HARQ-ACK and A-CSI by TDM by repeatedly transmitting the PUCCH resource on a time axis.

Proposed Method #3 may be applied in a combination with other proposed methods of the disclosure unless incompatible therewith.

<Method for Handling PUCCH Collision>

1. Collision Between A-CSI Transmission Through PUCCH and A-CSI Transmission Through PUCCH

[Proposed Method #4] When a plurality of PUCCH resources for A-CSI transmission, indicated for transmission (by the same or different pieces of DCI) for the same UE, overlaps (partially) in the time domain, the UE may operate according to at least one of the following options.

(1) Option 1: The UE determines that only A-CSI transmission indicated by the most recently received DCI is valid, transmits only the A-CSI through a PUCCH resource for indicated by the most recent DCI, and omits the remaining A-CSI transmissions.

Figure 16:
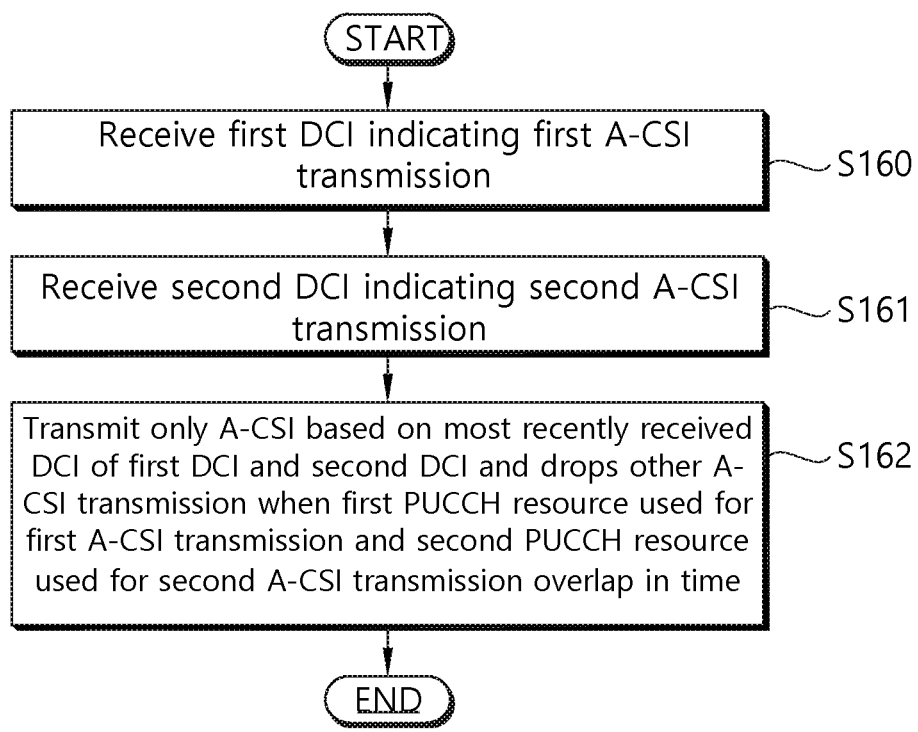
FIG. 16 illustrates a UE operation based on Option 1.

FIG. 16 illustrates a UE operation based on Option 1.

Referring to FIG. 16, a UE receives first DCI indicating first A-CSI transmission (S160) and receives second DCI indicating second A-CSI transmission (S161). Here, the order of times to receive the first DCI and the second DCI may be varied.

When a first PUCCH resource used for the first A-CSI transmission and a second PUCCH resource used for the second A-CSI transmission overlap in time, the UE transmits only A-CSI based on the most recently received DCI of the first DCI and the second DCI and drops the other A-CSI transmission.

(2) Option 2: The UE transmits A-CSI corresponding to a PUCCH resource having the largest PUCCH payload size (or having the largest number of time-axis resources allocated) through the PUCCH resource. Here, this operation may be applied only when a plurality of pieces of A-CSI is for the same CSI process.

(3) Option 3: The UE transmits (pieces of) A-CSI corresponding to up to N CSI processes through a single PUCCH resource and omits transmitting A-CSI not included in the N CSI processes.

A. Up to N pieces of A-CSI to be transmitted through the single PUCCH resource may be selected in order (or reverse order) of transmission indication on the time axis.

B. The single PUCCH resource transmitting the plurality of pieces of A-CSI may be one of the following resources.

i. PUCCH resource for A-CSI indicated by the most recent DCI

Here, the PUCCH resource for A-CSI may be reselected based on the total UCI payload size of the plurality of pieces of A-CSI and/or dynamically indicated information in the most recent DCI. That is, a PUCCH resource different from that for single A-CSI transmission may be selected.

The BS may configure separate PUCCH resources for transmitting a plurality of pieces of A-CSI and for transmitting a single piece of A-CSI for the UE (through a higher-layer signal or the like).

ii. PUCCH resource having the largest PUCCH payload size (or having the largest number of time-axis resources) among a plurality of PUCCH resources for A-CSI C. When the plurality of pieces of A-CSI is transmitted through the single PUCCH resource, the plurality of pieces of A-CSI may be jointly coded or separately coded.

(4) Option 4: The UE transmits A-CSI having the highest priority among the plurality of pieces of A-CSI through a PUCCH resource (indicated by the DCI) for the A-CSI.

(5) Option 5: The UE determines the above case as an error and omits transmitting all pieces of A-CSI for which PUCCH resources overlap on the time axis.

Here, the PUCCH resource having the largest PUCCH payload size among the plurality of PUCCH resources may be a PUCCH resource having the lowest coding rate.

Here, the BS may instruct the UE to follow a particular operation among the foregoing options through a higher-layer signal and/or DCI.

'1. Collision between A-CSI transmission through PUCCH and A-CSI transmission through PUCCH' is summarized as follows.

In an NR system according to an embodiment of the disclosure, an operation of flexibly indicating A-CSI transmission time through a higher-layer signal and/or DCI (e.g., an operation of configuring a plurality of transmission times via RRC signaling and indicating one thereamong via DCI) may be supported. Here, the BS may indicate, for the UE, a plurality of PUCCH resources for A-CSI transmission that overlaps on the time axis via pieces of DCI transmitted at different times. Thus, it is necessary to define a UE operation for this case.

According to one method, the UE may determine that only the most recently received DCI is valid and may transmit only A-CSI indicated by the DCI through a PUCCH resource for A-CSI transmission indicated in the DCI (Option 1). In this case, the BS may override an A-CSI reporting transmission indication previously indicated by the BS. When a plurality of PUCCH resources overlapping on the time axis is used to transmit A-CSI for the same CSI process, the A-CSI may be transmitted via a resource favorable for reception (from the perspective of the BS). For example, the A-CSI may be transmitted via a PUCCH resource having the largest PUCCH payload size or the largest number of symbols among the plurality of PUCCH resources indicated for the A-CSI (Option 2).

Alternatively, when a plurality of pieces of A-CSI corresponds to different CSI processes, up to N pieces of A-CSI may be transmitted together via a single PUCCH resource (Option 3). In this case, the single PUCCH resource may be a PUCCH resource reselected (or separately configured) by a different process from that for transmitting single A-CSI.

Alternatively, if pieces of A-CSI have priorities, only A-CSI having the highest priority may be transmitted (Option 4), or the UE may determine a collision between PUCCHs for A-CSI transmission illustrated above as an error and may omit transmitting all pieces of A-CSI.

Proposed Method #4 may be applied in a combination with other proposed methods of the disclosure unless incompatible therewith.

2. Collision Between A-CSI Transmission Through PUCCH and HARQ-ACK Transmission Through PUCCH

[Proposed Method #5] When a PUCCH resource for A-CSI transmission and a PUCCH resource for HARQ-ACK transmission, indicated for transmission (by the same or different pieces of DCI) for the same UE, overlap (partially) in the time domain, the UE may operate according to at least one of the following options.

(1) Option 1: The UE may transmit an HARQ-ACK via the PUCCH resource for HARQ-ACK transmission and may omit A-CSI transmission.

(2) Option 2: The UE may transmit an HARQ-ACK and CSI via a single PUCCH resource.

A. Here, the single PUCCH resource may be one of the following resources.

i. PUCCH resource having the largest PUCCH payload size among PUCCH resources for HARQ-ACK transmission or CSI transmission Or, ii. PUCCH resource for the HARQ-ACK reselected based on the total UCI payload size of the HARQ-ACK and the A-CSI and/or dynamically indicated information in the DCI. For example, the single PUCCH resource may be a PUCCH resource for the HARQ-ACK selected assuming that the HARQ-ACK having a UCI payload size of the HARQ-ACK plus the CSI is transmitted.

Or, iii. PUCCH resource separately configured to simultaneously transmit the HARQ-ACK and the CSI. Here, a pair of two PUCCH resources may be allocated as the PUCCH resource.

Further, the PUCCH resource may be iv. HARQ-ACK transmission resource, or v. A-CSI transmission resource.

(3) Option 3: The UE applies Option 1 or Option 2.

A. Option 1 or Option 2 may be applied under the following conditions.

i. Condition 1: Whether a PUCCH resource collision between an HARQ-ACK and A-CSI is indicated by the same DCI (e.g., A-CSI triggered by DL grant). For example, when the PUCCH resource collision between the HARQ-ACK and the A-CSI is indicated by the same DCI, Option 2 may be applied, and otherwise, Option 1 may be applied.

ii. Condition 2: Transmission-triggering time of an HARQ-ACK and/or A-CSI relative to transmission time of a single PUCCH resource to be used assuming that the HARQ-ACK and the A-CSI are transmitted together. For example, when the transmission-triggering time of the HARQ-ACK and/or the A-CSI relative to the transmission time of the single PUCCH resource to be used assuming that the HARQ-ACK and the A-CSI are transmitted together guarantees a sufficient UE processing time, Option 2 may be applied, and otherwise, Option 1 may be applied.

iii. Condition 3: Coding rate criterion where an HARQ-ACK and/or A-CSI are assumed to be simultaneously transmitted (based on joint coding).

For example, when the coding rate where an HARQ-ACK and/or A-CSI are assumed to be simultaneously transmitted (based on joint coding) is greater than the maximum coding rate set for a single PUCCH resource where the HARQ-ACK and the A-CSI are assumed to be transmitted together, Option 1 may be applied, and otherwise, Option 2 may be applied.

The BS may instruct the UE to follow a particular operation among the above options through a higher-layer signal and/or DCI.

When the BS indicates A-CSI transmission and HARQ-ACK transmission using the same PUCCH resource through different pieces of DCI, DCI indicating the A-CSI transmission may include information on whether to perform HARQ-ACK transmission in the PUCCH resource (or HARQ-ACK payload size) therein, while DCI indicating the HARQ-ACK transmission may include information on whether to perform A-CSI transmission in the PUCCH resource (or A-CSI payload size) therein.

Proposed Method #4 is summarized as follows. For example, a PUCCH resource for A-CSI transmission may be indicated by a UL grant, and a PUCCH resource for HARQ-ACK transmission may be indicated by a DL assignment. In this case, the PUCCH resource for A-CSI transmission and the PUCCH resource for HARQ-ACK transmission, which are indicated by different pieces of DCI, may overlap (partially) in the time domain. Thus, it is necessary to define a UE operation for this case.

The UE may determine that HARQ-ACK transmission has a higher priority and may thus transmit only an HARQ-ACK via the PUCCH for HARQ-ACK transmission, omitting A-CSI transmission (Option 1).

Alternatively, the UE may transmit an HARQ-ACK and A-CSI together via a single PUCCH resource (Option 2). The single PUCCH resource may be a PUCCH resource for HARQ-ACK transmission reselected based on the total UCI payload size of the HARQ-ACK and the A-CSI and/or information dynamically indicated within the DCI.

That is, when a plurality of PUCCH resource sets for HARQ-ACK transmission is configured through a higher-layer signal according to the range of a UCI payload size, the UE may select one PUCCH resource set based on the total UCI payload size of an HARQ-ACK and CSI. Subsequently, the UE may transmit an HARQ-ACK and A-CSI together using a PUCCH resource indicated by a specific DCI field in a DL assignment (triggering HARQ-ACK transmission) in the (selected) PUCCH resource set.

The DCI field may be the same as a DCI field indicating a PUCCH resource for HARQ-ACK transmission when only an HARQ-ACK is transmitted. Further, the UE may perform one operation of Option 1 and Option 2 according to a configuration and/or indication by the BS or may perform one operation of Option 1 and Option 2 according to a specific condition (Option 3). For example, when a PUCCH resource collision between an HARQ-ACK and A-CSI is indicated by the same DCI, the UE may apply Option 2, and otherwise, the UE may apply Option 1. Alternatively, when a transmission indication time of an HARQ-ACK and/or A-CSI guarantees a sufficient UE processing time compared to a transmission time of a single PUCCH resource where an HARQ-ACK and A-CSI are assumed to be transmitted together, the UE may apply Option 2, and otherwise, the UE may apply Option 1.

According to an additional operation of Proposed Method #5, when a PUCCH resource for A-CSI transmission and a PUCCH for HARQ-ACK transmission are indicated to be transmitted via the same (at least one) symbol, the UE may operate as follows.

(1) When the two PUCCH resource are same

Option 1: The UE jointly codes A-CSI and an HARQ-ACK and transmits them through the PUCCH resource. Option 2: The UE drops either A-CSI or an HARQ-ACK.

(2) When the two PUCCH resources are different

Option 1: The UE jointly codes A-CSI and an HARQ-ACK and transmits them through one of the two PUCCH resources. Option 2: The UE drops either A-CSI or an HARQ-ACK. Here, the UE transmits UCI (not dropped) through a PUCCH resource allocated therefor.

Proposed Method #5 may also be extensively applied to the case where a PUCCH (or PUSCH) resource for periodic CSI (P-CSI) (or semi-persistent CSI) transmission, other than a PUCCH for A-CSI transmission, collides with a PUCCH for HARQ-ACK transmission on the time axis. That is, when a PUCCH resource for P-CSI transmission and a PUCCH resource for HARQ-ACK transmission for the same UE overlap (partially) on the time axis, the UE operates as follows.

Option 1: The UE transmits an HARQ-ACK via the PUCCH resource for HARQ-ACK transmission and (partially or entirely) omits P-CSI transmission.

Option 2: The UE transmits an HARQ-ACK and CSI via a single PUCCH resource.

Here, the single PUCCH resource may be one of the following resources.

1. HARQ-ACK transmission resource, 2. P-CSI transmission resource, 3. PUCCH resource having the largest PUCCH payload size among PUCCH resources for HARQ-ACK transmission or CSI transmission, 4. PUCCH resource for the HARQ-ACK reselected based on the total UCI payload size of the HARQ-ACK and the A-CSI and/or dynamically indicated information in the DCI (For example, the single PUCCH resource may be a PUCCH resource for the HARQ-ACK selected assuming that the HARQ-ACK having a UCI payload size of the HARQ-ACK plus the CSI is transmitted.), 5. PUCCH resource separately configured to simultaneously transmit the HARQ-ACK and the CSI (Here, a pair of two PUCCH resources may be allocated as the PUCCH resource.).

Option 3: The UE applies Option 1 or Option 2. Here, Option 1 or Option 2 may be applied under the following conditions.

Condition A: Option 1 or Option 2 may be selected based on transmission-triggering time of an HARQ-ACK and/or P-CSI relative to transmission time of a single PUCCH resource to be used assuming that the HARQ-ACK and the P-CSI are transmitted together.

For example, when the transmission-triggering time of the HARQ-ACK and/or the P-CSI relative to the transmission time of the single PUCCH resource to be used assuming that the HARQ-ACK and the P-CSI are transmitted together guarantees a sufficient UE processing time, Option 2 may be applied, and otherwise, Option 1 may be applied.

Condition B: Option 1 or Option 2 may be selected based on coding rate criterion where an HARQ-ACK and/or P-CSI are assumed to be simultaneously transmitted (based on joint coding).

For example, when the coding rate where an HARQ-ACK and/or P-CSI are assumed to be simultaneously transmitted (based on joint coding) is greater than the maximum coding rate set for a single PUCCH resource where the HARQ-ACK and the P-CSI are assumed to be transmitted together, Option 1 may be applied, and otherwise, Option 2 may be applied.

Proposed Method #5 may be applied in a combination with other proposed methods of the disclosure unless incompatible therewith.

3. Collision Between A-CSI Transmission Through PUCCH and SR Transmission Through PUCCH.

[Proposed Method #6] When a PUCCH resource for A-CSI transmission and a PUCCH resource for SR transmission, indicated for transmission (by the same or different pieces of DCI) for the same UE, overlap (partially) on the time axis, the UE transmits an SR by adding (explicit) one-bit SR information (e.g., a positive SR or negative SR) to a UCI payload for A-CSI in the PUCCH resource for A-CSI transmission.

When there is a collision between the PUCCH resource for A-CSI transmission and the PUCCH resource for SR transmission, it may be preferable to add information on an SR to the PUCCH resource for A-CSI transmission, because the SR can be explicitly expressed with only one bit but the UCI payload size of A-CSI is relatively very large. For example, the SR may be transmitted by adding (explicit) one-bit SR information (e.g., a positive SR or negative SR) to the UCI payload size in the PUCCH resource for A-CSI transmission.

Proposed Method #6 may be applied in a combination with other proposed methods of the present description unless incompatible therewith.

<PUSCH Collision Handling>

[Proposed Method #7] When a PUCCH resource for A-CSI (or specific UCI) transmission and a PUSCH resource, indicated for transmission (by the same or different pieces of DCI) for the same UE, overlap (partially) in the time domain, the UE may operate according to at least one of the following options.

(1) Option 1: The UE may transmit UCI by piggybacking on a PUSCH.

A. the UE may transmit A-CSI (or specific UCI) by UCI piggybacking on the PUSCH.

B. the transmission of a PUCCH indicated for A-CSI transmission is omitted.

C. the A-CSI (or specific UCI) may be subjected to UCI piggybacking based on PUSCH rate-matching, and a UL grant scheduling the PUSCH may include the following information.

i. Whether UCI piggybacking is performed on the A-CSI (or specific UCI). In this case, the UCI payload size of the A-CSI is configured via a higher-layer signal.

ii. Rate-matching information on the A-CSI (or specific UCI) (e.g., the UCI payload size of the A-CSI or the amount of PUSCH rate-matching resources (for A-CSI transmission))

D. the A-CSI (or specific UCI) may also be subjected to UCI piggybacking based on PUSCH puncturing.

E. UCI piggybacking may be allowed only for a PUCCH for A-CSI (or specific UCI) transmission that is indicated (e.g., triggered) to be transmitted a certain time before a PUSCH transmission time to guarantee a sufficient UE processing time and may not be allowed for other PUCCHs for A-CSI (or specific UCI) transmission.

(2) Option 2: The UE performs PUSCH puncturing in a time resource in a PUSCH that overlaps a PUCCH for A-CSI (or specific UCI) transmission and then transmits the PUSCH and the PUCCH for A-CSI (or specific UCI) transmission by TDM.

(3) Option 3: The UE omits A-CSI transmission and transmits only a PUSCH.

(4) Option 4: The UE applies Option 1 or Option 2 (or Option 3). Here, Option 1 or Option 2 (or Option 3) may be applied under the following conditions.

i. Condition A: Regarding relative transmission times between a PUCCH for A-CSI (or specific UCI) transmission and a PUSCH, for example, when a transmission time of the PUCCH for A-CSI (or specific UCI) transmission is equal to or earlier than a transmission time of the PUSCH, the UE may apply Option 1, and otherwise, the UE may apply Option 2 (or Option 3). Alternatively, for example, when the transmission time of the PUCCH for A-CSI (or specific UCI) transmission is equal to, earlier than, or later by X symbols or less than the transmission time of the PUSCH, the UE may apply Option 1, and otherwise, the UE may apply Option 2 (or Option 3).

ii. Condition B: Regarding an A-CSI-triggering time relative to a PUSCH transmission time, for example, when transmission of A-CSI (or specific UCI) is indicated (that is, A-CSI is triggered) a certain time before a PUSCH transmission (start) time and thus a PUCCH for A-CSI (or specific UCI) transmission guarantees a sufficient UE processing time for the UE, the UE may apply Option 1, and when a PUCCH for A-CSI (or specific UCI) transmission does not guarantee a sufficient UE processing time, the UE may apply Option 2 (or Option 3).

iii. Condition C: Regarding the amount of time-axis resources overlapping between a PUCCH for A-CSI (or specific UCI) transmission and a PUSCH, the number of time-axis symbols of the PUSCH overlapping those of the PUCCH for A-CSI (or specific UCI) transmission corresponds to (last) X (e.g., X=1 or 2) symbols or less, the UE may apply Option 2, and otherwise, the UE may apply Option 1.

iv. Condition D: Regarding an A-CSI-triggering DCI reception time relative to a reception time of a UL grant for a PUSCH, when the A-CSI-triggering DCI reception time is earlier than the reception time of the UL grant scheduling the PUSCH, the UE may apply Option 1, and otherwise, the UE may apply Option 2.

The specific UCI may be any UCI type (e.g., an HARQ-ACK, periodic CSI, an SR, or the like) other than A-CSI.

The BS may instruct the UE to follow a particular operation among the foregoing options through a higher-layer signal and/or DCI.

When A-CSI transmission is indicated by a UL grant, an A-CSI transmission time may follow a PUSCH transmission time or a transmission time indicated by a separate DCI field.

In summary, when a collision occurs between a PUCCH for A-CSI transmission and a PUSCH that are transmitted by the same UE, two methods may be considered. First, the UE may omit transmitting the PUCCH and may transmit A-CSI through a PUSCH by UCI piggybacking (Option 1).

Alternatively, when only last one or two symbols overlap between resources for the PUCCH for A-CSI transmission and the PUSCH, the UE may puncture data in the overlapping symbol interval in the PUSCH and may transmit the PUSCH and the PUCCH for A-CSI (transmission) by TDM (Option 2). Here, the UE may apply Option 1 or Option 2 according to a configuration or indication by the BS or may selectively apply Option 1 or Option 2 according to a specific condition (Option 3).

For example, when transmission of A-CSI (or specific UCI) is indicated (that is, A-CSI is triggered) a certain time before a PUSCH transmission (start) time and thus a PUCCH for A-CSI (or specific UCI) transmission guarantees a sufficient UE processing time for the UE, the UE may apply Option 1, and when a PUCCH for A-CSI (or specific UCI) transmission does not guarantee a sufficient UE processing time, the UE may apply Option 2 (or Option 3).

Proposed Method #7 may be applied in a combination with other proposed methods of the disclosure unless incompatible therewith.

4. Issues Related to Carrier Aggregation

[Proposed Method #8] Pieces of DCI (e.g., a DL assignment or UL grant) that indicate A-CSI reporting using the same PUCCH resource (or the same PUSCH resource or PUSCH resources having the same transmission time) in a transmission environment based on multiple slots or carrier aggregation (CA) equally transmit the following information.

(1) Information on A-CSI reporting target

For example, information on a CSI process for which A-CSI reporting is performed may be included.

(2) Information on whether A-CSI is subjected to UCI piggybacking or on PUSCH rate-matching (e.g., A-CSI payload size or PUSCH rate-matching resource amount)

(3) A-CSI transmission PUCCH resource information

Here, a PUSCH resource in which the A-CSI reporting is performed at a specific transmission time may be a resource selected according to pre-agreed priority rules from among PUSCH resources indicated for transmission at the transmission time.

For example, when different pieces of DCI transmitted in a plurality of cells (or carriers) indicate the same A-CSI transmission PUCCH resource but indicate different A-CSI reporting targets, respectively, if a UE fails to detect some of the pieces of DCI (e.g., DCI missing), a mismatch may occur in the payload size of A-CSI to be transmitted via the PUCCH resource between a UE and a BS.

Therefore, the present description proposes a method for matching pieces of information on A-CSI reporting targets between pieces of DCI indicating the transmission of an A-CSI report via the same PUCCH resource.

Alternatively, it may be also preferable to match pieces of information on A-CSI reporting targets between pieces of DCI (e.g., UL grants) indicating UCI piggybacking for A-CIS via PUSCHs of the same transmission time (or the UCI payload size of A-CSI for PUSCH rate-matching or the amount of resources for PUSCH rate-matching).

That is, all (DL or UL) grants (in the CC/slot domain) corresponding to the same PUCCH (or PUSCH) transmission can be stipulated to indicate the same CSI process and/or the same CIS report on/off and/or the same PUCCH resource.

Proposed Method #8 may be applied in a combination with other proposed methods of the present description unless incompatible therewith.

5. Power Control

[Proposed Method #9] For a PUSCH and a PUCCH scheduled/indicated through the same (UL) grant DCI, one common TPC is applied or a TPC (to be applied to a PUCCH) is separately indicated.

Here, a transmission power control (TPC) refers to UL power control-related information dynamically indicated.

Here, a BS may configure for a UE whether there is a separate TPC field (to be applied to a PUCCH) in a (UL) grant through a higher-layer signal.

For example, when the UE transmits A-CSI via a PUCCH and an A-CSI transmission PUCCH resource is indicated via a UL grant, UL power control-related information on a PUSCH scheduled by the UL grant may also be applied to the A-CSI transmission PUCCH.

Specifically, TPC information indicating the variance in UL power value for the PUSCH may be commonly applied to the A-CSI transmission PUCCH. Alternatively, a TPC field for the PUSCH and a TPC field for the PUCCH may be separately configured in the UL grant in order to support independent UL power control between the PUCCH and the PUSCH in an environment where UL transmission times are divided for the PUSCH and the PUCCH.

Proposed Method #9 may be applied in a combination with other proposed methods of the present description unless incompatible therewith.

Figure 17:
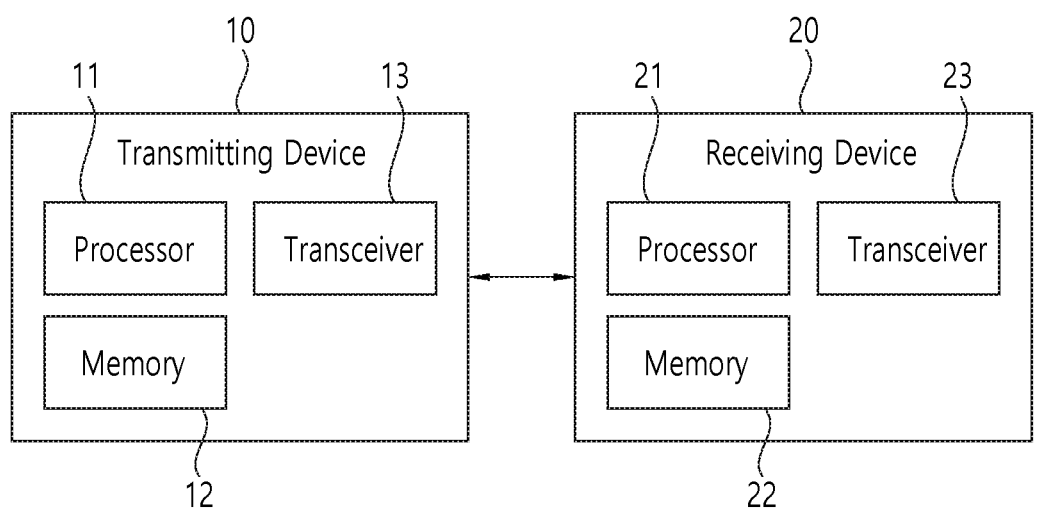
FIG. 17 is a block diagram illustrating components of a transmission device 10 and a reception device 20 to implement the present description.

FIG. 17 is a block diagram illustrating components of a transmission device 10 and a reception device 20 to implement the present description. Here, each of the transmission device and the reception device may be a BS or a UE.

The transmission device 10 and the reception device 20 may respectively include: transceivers 13 and 23 capable of transmitting or receiving a radio signal carrying information and/or data, a signal, a messages, and the like; memories 12 and 22 to store various kinds of information related to communication in a wireless communication system; and processors 11 and 21 connected to components, such as the memories 12 and 22 and the transceivers 13 and 23, and configured to control the memories 12 and 22 and the transceivers 13 and 23 so that the devices perform at least one of the foregoing embodiments of the present description.

The memories 12 and 22 may store a program for processing and controlling the processors 11 and 21 and may temporarily store input/output information. The memories 12 and 22 may be used as buffers.

The processors 11 and 21 generally control the overall operation of various modules in the transmission device or the receiving device. In particular, the processors 11 and 21 may perform various control functions to implement the present description. The processors 11 and 21 may also be referred to as controllers, microcontrollers, microprocessors, microcomputers, or the like. The processors 11 and 21 may be configured with hardware, firmware, software, or a combination thereof. When the present description is implemented using hardware, application-specific integrated circuits (ASICs), digital signal processors (DSPs), digital signal processing devices (DSPDs), programmable logic devices (PLDs), or field programmable gate arrays (FPGAs) may be included in the processors 11 and 21. When the present description is implemented using firmware or software, the firmware or software may be configured to include a module, a procedure, or a function to perform the functions or operations of the present description, and the firmware or software configured to perform the present description may be provided in the processors 11 and 21 or stored in the memories 12 and 22 to be executed by the processors 11 and 21.

The processor 11 of the transmission device 10 may code and modulate a signal and/or data to be transmitted to the outside and may then transmit the same to the transceiver 13. For example, the processor 11 may generate a codeword through demultiplexing, channel encoding, scrambling, and modulation of a data stream to be transmitted. The codeword may include information equivalent to a transport block which is a data block provided by a MAC layer. One transport block (TB) may be encoded into one codeword. Each codeword may be transmitted to the reception device through one or more layers. The transceiver 13 may include an oscillator for frequency up-conversion. The transceiver 13 may include one or a plurality of transmission antennas.

The signal processing process of the reception device 20 may be configured according to the inverse of the signal processing process of the transmission device 10. Under the control of the processor 21, the transceiver 23 of the reception device 20 may receive a radio signal transmitted by the transmission device 10. The transceiver 23 may include one or a plurality of reception antennas. The transceiver 23 may restore each signal received through the reception antenna into a baseband signal via frequency down-conversion. The transceiver 23 may include an oscillator for frequency down-conversion. The processor 21 may decode and demodulate the radio signal received through the reception antenna, thus restoring data originally transmitted by the transmission device 10.

The transceivers 13 and 23 may include one or a plurality of antennas. According to one embodiment of the present description, under the control of the processors 11 and 21, the antenna may transmit a signal processed by the transceivers 13 and 23 to the outside or may receive a radio signal from the outside to transmit the same to the transceivers 13 and 23. The antenna may be referred to as an antenna port. Each antenna may correspond to one physical antenna or may be configured in a combination of two or more physical antenna elements. A signal transmitted from each antenna cannot further be broken down by the reception device 20. A reference signal (RS) transmitted corresponding to the antenna defines an antenna from the perspective of the reception device 20 and enables the reception device 20 to estimate a channel to the antenna regardless of whether the channel is a single radio channel from one physical antenna or a composite channel from a plurality of physical antenna elements including the antenna. That is, the antenna may be defined such that a channel carrying a symbol on the antenna can be derived from the channel carrying another symbol on the same antenna. A transceiver supporting a multi-input multi-output (MIMO) function of transmitting and receiving data using a plurality of antennas may be connected to two or more antennas.

Figure 18:
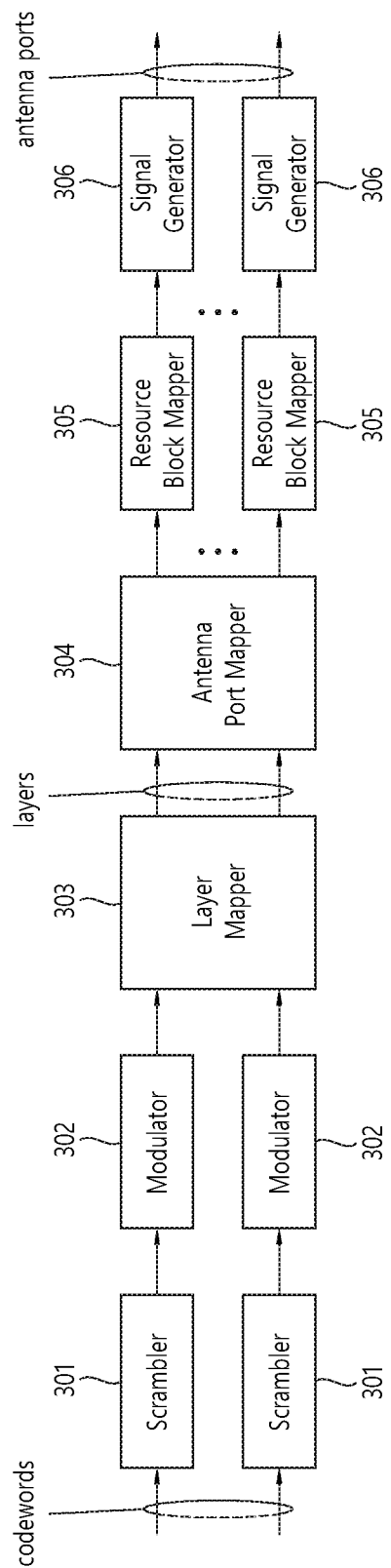
FIG. 18 illustrates an example of the structure of a signal processing module in the transmission device 10.

FIG. 18 illustrates an example of the structure of a signal processing module in the transmission device 10. Here, signal processing may be performed in a processor of a BS/UE, such as the processor 11 of FIG. 17.

Referring to FIG. 18, the transmission device 10 in the UE or the BS may include a scrambler 301, a modulator 302, a layer mapper 303, an antenna port mapper 304, a resource block mapper 305, and a signal generator 306.

The transmission device 10 may transmit one or more codewords. Coded bits in each codeword are scrambled by the scrambler 301 and are transmitted on a physical channel. A codeword may also be referred to as a data stream and may be equivalent to a transport block which is a data block provided by a MAC layer.

The scrambled bits are modulated into complex-valued modulation symbols by the modulator 302. The modulator 302 may modulate the scrambled bits according to a modulation scheme into complex-valued modulation symbols representing a position on a signal constellation. The modulation scheme is not restricted, and m-phase shift keying (m-PSK) or m-quadrature amplitude modulation (m-QAM) may be used to modulate the encoded data. The modulator may be referred to as a modulation mapper.

The complex-valued modulation symbols may be mapped to one or more transport layers by the layer mapper 303. Complex-valued modulation symbols on each layer may be mapped by the antenna port mapper 304 for transmission on an antenna port.

The resource block mapper 305 may map the complex-valued modulation symbols for each antenna port to an appropriate resource element in a virtual resource block allocated for transmission. The resource block mapper may map the virtual resource block to a physical resource block according to an appropriate mapping scheme. The resource block mapper 305 may allocate the complex-valued modulation symbols for each antenna port to an appropriate subcarrier and may multiplex the subcarriers according to a user.

The signal generator 306 may modulate the complex-valued modulation symbols for each antenna port, that is, antenna-specific symbols, by a specific modulation scheme, for example, an orthogonal frequency division multiplexing (OFDM) scheme, thereby generating a complex-valued time-domain OFDM symbol signal. The signal generator may perform inverse fast Fourier transform (IFFT) on the antenna-specific symbols, and a cyclic prefix (CP) may be inserted into the time-domain symbols having been subjected to IFFT. The OFDM symbols are transmitted to the reception device through each transmission antenna via digital-to-analog conversion, frequency up-conversion, and the like. The signal generator may include an IFFT module and a CP inserter, a digital-to-analog converter (DAC), a frequency uplink converter, and the like.

Figure 19:
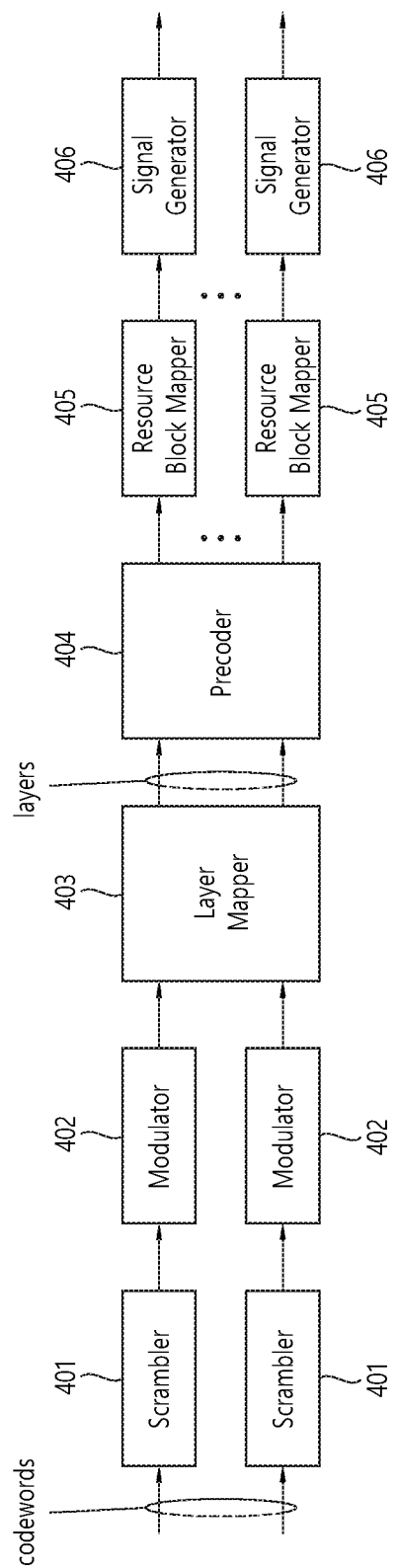
FIG. 19 illustrates another example of the structure of a signal processing module in the transmission device 10.

FIG. 19 illustrates another example of the structure of a signal processing module in the transmission device 10. Here, signal processing may be performed in a processor of a BS/UE, such as the processor 11 of FIG. 17.

Referring to FIG. 19, the transmission device 10 in the UE or the BS may include a scrambler 401, a modulator 402, a layer mapper 403, a precoder 404, a resource block mapper 405, and a signal generator 406.

The transmission device 10 may scramble coded bits in one codeword using the scrambler 401 and may then transmit the same through a physical channel.

The scrambled bits are modulated into complex-valued modulation symbols by the modulator 402. The modulator may modulate the scrambled bits according to a predetermined modulation scheme into complex-valued modulation symbols representing a position on a signal constellation. The modulation scheme is not restricted, and pi/2-binary phase shift keying (pi/2-BPSK), m-phase shift keying (m-PSK), or m-quadrature amplitude modulation (m-QAM) may be used to modulate the encoded data.

The complex-valued modulation symbols may be mapped to one or more transport layers by the layer mapper 403.

Complex-valued modulation symbols on each layer may be precoded by the precoder 404 for transmission on an antenna port. Here, the precoder may perform precoding after performing transform precoding on the complex-valued modulation symbols. Alternatively, the precoder may perform precoding without performing transform precoding. The precoder 404 may process the complex-valued modulation symbols by a MIMO scheme according to a multi-transmission antenna to output antenna-specific symbols and may distribute the antenna-specific symbols to the corresponding resource block mapper 405. Output z from the precoder 404 may be obtained by multiplying output y from the layer mapper 403 by an N×M precoding matrix W, where N is the number of antenna ports, and M is the number of layers.

The resource block mapper 405 may map the complex-valued modulation symbols for each antenna port to an appropriate resource element in a virtual resource block allocated for transmission.

The resource block mapper 405 may allocate the complex-valued modulation symbols to an appropriate subcarrier and may multiplex the subcarriers according to a user.

The signal generator 406 may modulate the complex-valued modulation symbols by a specific modulation scheme, for example, an OFDM scheme, thereby generating a complex-valued time-domain OFDM symbol signal. The signal generator 406 may perform inverse fast Fourier transform (IFFT) on the antenna-specific symbols, and a cyclic prefix (CP) may be inserted into the time-domain symbols having been subjected to IFFT. The OFDM symbols are transmitted to the reception device through each transmission antenna via digital-to-analog conversion, frequency up-conversion, and the like. The signal generator 406 may include an IFFT module and a CP inserter, a digital-to-analog converter (DAC), a frequency uplink converter, and the like.

The signal processing process of the reception device 20 may be configured according to the inverse of the signal processing process of the transmission device. Specifically, the processor 21 of the reception device 20 decodes and demodulates a radio signal received through an antenna port(s) of the transceiver 23. The reception device 20 may include a plurality of multi-reception antennas, and each signal received through the reception antennas is restored to a baseband signal, and is then restored to a data stream, originally transmitted by the transmission device 10, via multiplexing and MIMO demodulation. The reception device 20 may include a signal reconstructor to restore a received signal to a baseband signal, a multiplexer to combine and multiplex received signals, and a channel demodulator to demodulate a multiplexed signal stream into a codeword. The signal reconstructor, the multiplexer, and the channel demodulator may be configured as one integrated module to perform their functions or as separate modules. Specifically, the signal reconstructor may include an analog-to-digital converter (ADC) to convert an analog signal into a digital signal, a CP remover to remove a CP from a digital signal, a fast Fourier transform (FFT) module to apply FFT to a CP-removed signal to output a frequency-domain symbol, and a resource element demapper/equalizer to restore a frequency-domain symbol into an antenna-specific symbol.

Figure 20:
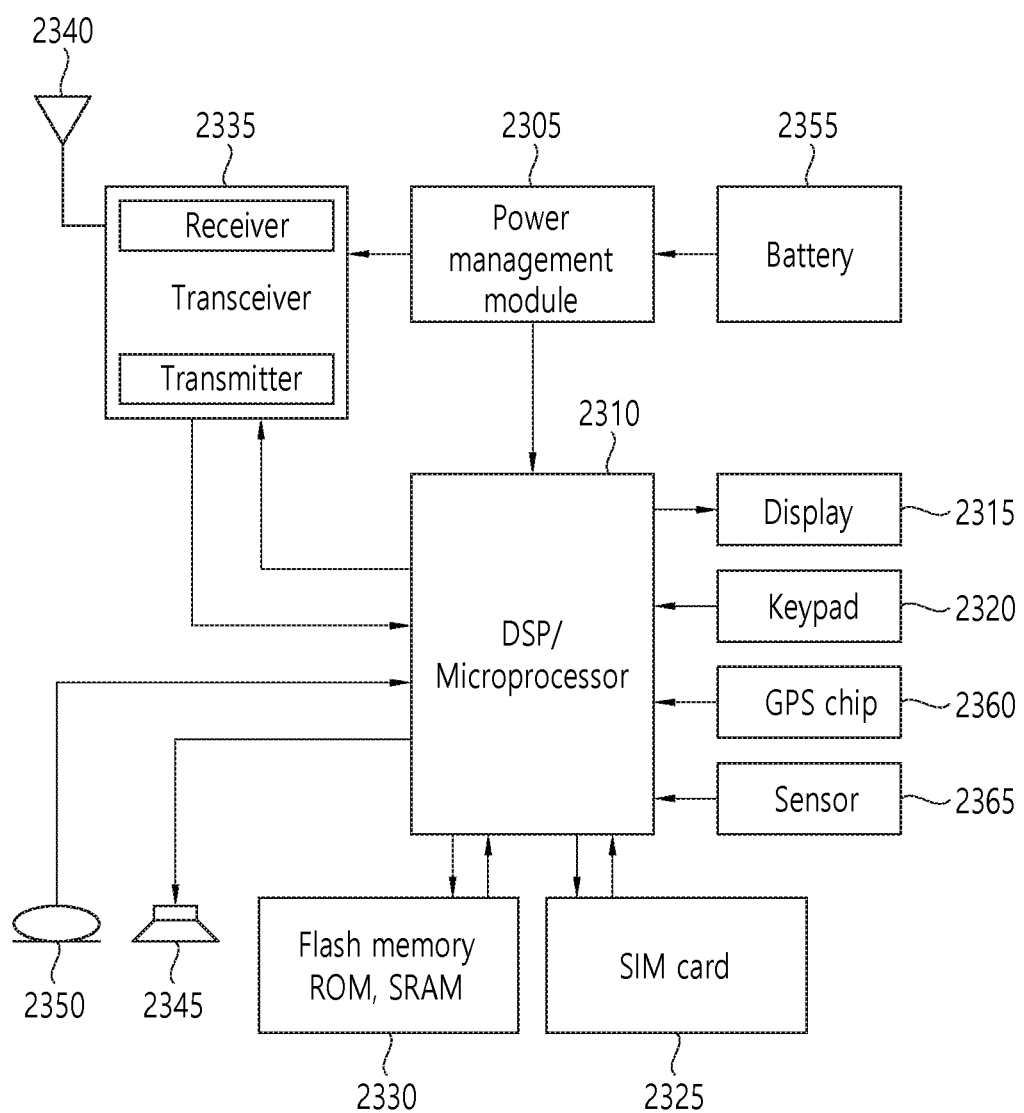
FIG. 20 illustrates an example of a wireless communication device according to an embodiment of the present description.

FIG. 20 illustrates an example of a wireless communication device according to an embodiment of the present description.

According to FIG. 20, the wireless communication device, for example, a UE, may include and at least one of a processor 2310, such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. There may be a plurality of antennas and a plurality of processors.

The processor 2310 may implement the functions, procedures, and methods described herein. The processor 2310 of FIG. 20 may be the processors 11 and 21 of FIG. 17.

The memory 2330 is connected to the processor 2310 and stores information related to the operation of the processor. The memory may be disposed inside or outside the processor and may be connected to the processor through various technologies, such as a wired connection or a wireless connection. The memory 2330 of FIG. 20 may be the memories 12 and 22 of FIG. 17.

A user may input various kinds of information, such as a telephone number, using various techniques, for example, by pressing a button of the keypad 2320 or by activating a sound using the microphone 2350. The processor 2310 may perform an appropriate function, such as receiving and processing user information and making a phone call with an input telephone number. In some scenarios, data may be retrieved from the SIM card 2325 or the memory 2330 to perform an appropriate function. In some scenarios, the processor 2310 may display various kinds of information and data on the display 2315 for the convenience of the user.

The transceiver 2335 is connected to the processor 2310 and transmits and/or receives a radio signal, such as a radio frequency (RF) signal. The processor may control the transceiver to initiate communication or to transmit a radio signal including various kinds of information or data, such as voice communication data. The transceiver includes a transmitter and a receiver to transmit and receive radio signals. The antenna 2340 may facilitate the transmission and reception of radio signals. In some embodiments, upon receiving a radio signal, the transceiver may forward and convert the signal with a baseband frequency for processing by the processor. The processed signal may be processed by various techniques, such as being converted into audible or readable information to be output through the speaker 2345. The transceiver of FIG. 20 may be the transceivers 13 and 23 of FIG. 17.

Although not shown in FIG. 20, various components, such as a camera and a universal serial bus (USB) port, may be additionally included in the UE. For example, the camera may be connected to the processor 2310.

FIG. 20 shows only one example of the UE, and various examples may be provided without being limited thereto. The UE should not necessarily include all the components illustrated in Figure D. That is, some components, for example, the keypad 2320, the GPS chip 2360, the sensor 2365, and the SIM card 2325, may not be essential components and may thus not be included in the UE.

What is claimed is:

1. A method for transmitting aperiodic channel state information (A-CSI) in a wireless communication system, the method performed by a user equipment (UE) and comprising:
receiving a higher-layer signal configuring a plurality of physical uplink control channel (PUCCH) resource sets for transmitting a first A-CSI;
receiving downlink control information (DCI) informing the UE of a first PUCCH resource for transmitting the first A-CSI, among PUCCH resources in the plurality of PUCCH resource sets;
based on the first PUCCH resource overlapping with a second PUCCH resource for transmitting a second A-CSI, transmitting the A-CSI, among the first A-CSI and the second A-CSI, which has a larger number of time-axis resources allocated; and
based on the first PUCCH resource overlapping with a resource for physical uplink shared channel, (PUSCH), dropping the first A-CSI,
wherein the plurality of PUCCH resource sets are configured per a channel state information (CSI) process,
wherein the UE selects one PUCCH resource set from among the plurality of PUCCH resource sets based on a payload size of the first A-CSI and the CSI process for which the first A-CSI is transmitted, and determines the first PUCCH resource informed by the DCI, among PUCCH resources in the selected one PUCCH resource set.

2. The method of claim 1, wherein the higher-layer signal is a radio resource control (RRC) signal.

3. The method of claim 1, wherein the DCI is received through a physical downlink control channel (PDCCH).

4. The method of claim 1, wherein the CSI process is a set of a reference signal and a resource element for CSI measurement.

5. The method of claim 1, wherein the DCI comprises information indicating triggering of the CSI process among a plurality of CSI processes.

6. The method of claim 5, wherein the DCI is an uplink grant scheduling uplink transmission by the UE.

7. The method of claim 1, wherein each of the PUCCH resources comprised in the plurality of PUCCH resource sets comprises one or two symbols in a slot in a time domain.

8. A user equipment (UE) configured to transmit aperiodic channel state information (A-CSI) in a wireless communication system, the UE comprising:
a transceiver;
a processor coupled with the transceiver; and
a computer-readable memory coupled with the processor and storing instructions that, based on being executed by the processor, control the UE to perform operations comprising:
receiving a higher-layer signal configuring a plurality of physical uplink control channel (PUCCH) resource sets for transmitting a first A-CSI,
receiving downlink control information (DCI) informing the UE of a first PUCCH resource for transmitting the first A-CSI, among PUCCH resources in the plurality of PUCCH resource sets, based on the first PUCCH resource overlapping with a second PUCCH resource for transmitting a second A-CSI, transmitting the A-CSI, among the first A-CSI and the second A-CSI, which has a larger number of time-axis resources allocated, and
based on the first PUCCH resource overlapping with a resource for physical uplink shared channel, (PUSCH), dropping the first A-CSI, wherein the plurality of PUCCH resource sets are configured per a channel state information (CSI) process, wherein the UE selects one PUCCH resource set from among the plurality of PUCCH resource sets based on a payload size of the first A-CSI and the CSI process for which the first A-CSI is transmitted, and determines the first PUCCH resource informed by the DCI, among PUCCH resources in the selected one PUCCH resource set.

9. The UE of claim 8, wherein the higher-layer signal is a radio resource control (RRC) signal.

10. The UE of claim 8, wherein the DCI is received through a physical downlink control channel (PDCCH).

11. The UE of claim 8, wherein the CSI process is a set of a reference signal and a resource element for CSI measurement.

12. The UE of claim 8, wherein the DCI comprises information indicating triggering of the CSI process among a plurality of CSI processes.

13. The UE of claim 12, wherein the DCI is an uplink grant scheduling uplink transmission by the UE.

14. The UE of claim 8, wherein each of the PUCCH resources comprised in the plurality of PUCCH resource sets comprises one or two symbols in a slot in a time domain.

* * * * *